US011055750B2

(12) United States Patent
Cory et al.

(10) Patent No.: US 11,055,750 B2
(45) Date of Patent: Jul. 6, 2021

(54) SYSTEMS AND METHODS FOR PRIORITY-BASED OPTIMIZATION OF DATA ELEMENT UTILIZATION

(71) Applicant: Adap.tv, Inc., Dulles, VA (US)

(72) Inventors: Amir Cory, Palo Alto, CA (US); Shubo Liu, Belmont, CA (US)

(73) Assignee: ADAP.TV, INC., Dulles, VA (US)

( * ) Notice: Subject to any disclaimer, the term of this patent is extended or adjusted under 35 U.S.C. 154(b) by 24 days.

(21) Appl. No.: 16/115,873

(22) Filed: Aug. 29, 2018

(65) Prior Publication Data
US 2019/0043096 A1 Feb. 7, 2019

Related U.S. Application Data

(63) Continuation of application No. 14/861,888, filed on Sep. 22, 2015, now Pat. No. 10,089,657.

(51) Int. Cl.
*G06Q 30/00* (2012.01)
*G06Q 30/02* (2012.01)

(52) U.S. Cl.
CPC ..... *G06Q 30/0276* (2013.01); *G06Q 30/0244* (2013.01); *G06Q 30/0249* (2013.01)

(58) Field of Classification Search
None
See application file for complete search history.

(56) References Cited

U.S. PATENT DOCUMENTS

| 8,706,798 B1* | 4/2014 | Suchter | H04L 43/0876 709/202 |
|---|---|---|---|
| 2003/0233391 A1* | 12/2003 | Crawford, Jr. | G06F 9/505 718/104 |
| 2005/0039183 A1* | 2/2005 | Romero | G06F 9/5061 718/100 |
| 2007/0006278 A1* | 1/2007 | Ioan Avram | G06Q 10/06 726/1 |

(Continued)

OTHER PUBLICATIONS

IP.com Search Strategy dated Mar. 10, 2021. (Year: 2021).*
STIC EIC 3600 Search Report for U.S. Appl. No. 16/115,873 dated Jan. 17, 2020. (Year: 2020).*

*Primary Examiner* — Matthew T Sittner
(74) *Attorney, Agent, or Firm* — Bookoff McAndrews, PLLC

(57) ABSTRACT

Systems and methods are disclosed for optimizing distribution of resources to data elements, comprising receiving a selection of a first objective and a second objective, the first objective and second objective comprising goals associated with distribution of a plurality of data elements; receiving an indication that the first objective has a higher priority than the second objective; receiving a first goal metric associated with the first objective and a second goal metric associated with the second objective; determining a first forecasted metric based on the first goal metric associated with the first objective; determining a second forecasted metric based on the second goal metric associated with the second objective; and allocating resources for the distribution of a plurality of data elements based on the first goal metric, the second goal (Continued)

metric, the first forecasted metric, the second forecasted metric, and the indication that the first objective has a higher priority than the second objective.

20 Claims, 18 Drawing Sheets

(56) References Cited

U.S. PATENT DOCUMENTS

| | | | |
|---|---|---|---|
| 2007/0234365 A1* | 10/2007 | Savit | G06F 9/505 |
| | | | 718/104 |
| 2009/0125619 A1* | 5/2009 | Antani | G06Q 10/00 |
| | | | 709/223 |
| 2015/0227961 A1* | 8/2015 | Chetan | G06Q 30/0242 |
| | | | 705/14.41 |
| 2016/0246652 A1* | 8/2016 | Herdrich | G06F 9/5077 |
| 2019/0043096 A1* | 2/2019 | Cory | G06Q 30/0249 |

* cited by examiner

CAMPAIGNS

| | | | | | | | | | | |
|---|---|---|---|---|---|---|---|---|---|---|
| IN FLIGHT 21 | UPCOMING 6 | ENDED 2 | ALL 29 | | | | | | | CREATE NEW ▸ |
| SEARCH 🔍 | FILTERS | | | | | | | | | ⚙ |
| CAMPAIGN/GROUP/DATA ELEMENT | | START DATE | END DATE | PACING | IMPRESSIONS | SPEND | BID | CR | TARGETING | OPTIONS |
| ▸ FASTERADE DOG FOOD, NBA CAMPAIGN ◎ | P2 | 9/15/2014 | 9/15/2014 | 0% | 0 | $0 | $0 | - | 0.00% | ⚙ |
| ▸ PRIVATE EXCHANGE DATA ELEMENT GROUP ◎ | P1 | 7/01/2014 | 7/01/2014 | 17% | 715,939 | $997 | $0 | - | 1.54% | ⚙ |
| ▸ DIRECT INVENTORY DATA ELEMENT GROUP ◎ | P1 | 9/22/2014 | 9/22/2014 | 26% | 696,635 | $9,334 | $0 | - | 1.76% | ⚙ |
| ▸ FASTERADE MARKETPLACE CAMPAIGN ◎ | P1 | 7/01/2014 | 7/01/2014 | 0% | 0 | $0 | $0 | - | 0.00% | ⚙ |
| ▸ FASTERADE GROUP 1 ◎ | P1 | 9/15/2014 | 9/15/2014 | 0% | 0 | $0 | $0 | - | 0.00% | ⚙ |
| ▸ FASTERADE GROUP 2 ◎ | P2 | 7/01/2014 | 7/01/2014 | 0% | 0 | $0 | $0 | - | 0.00% | ⚙ |
| ▸ TEST GROUP ◎ | P2 | 9/22/2014 | 9/22/2014 | 0% | 0 | $0 | $0 | - | 0.00% | ⚙ |

| ALL CAMPAIGNS/ SAMPLE CAMPAIGN/ NEW DATA ELEMENT GROUP |
|---|

NEW DATA ELEMENT GROUP

| GENERAL | BID & OPTIMIZATION | DATA ELEMENTS |
|---|---|---|

GENERAL OPTIONS

515 — STATUS  ⦿ PAUSED  ◯ LIVE

DATA ELEMENT GROUP NAME* [ NEW DATA ELEMENT GROUP ]

605 — NOTES [                    ]

607 {
START #1* [📅 MM/DD/YYYY] [🕐 12:00 AM] ET
END #1* [📅 MM/DD/YYYY] [🕐 11:59 PM] ET
}

610 — [ + FLIGHT ]

DATA ELEMENT GROUP GOAL

615 — DATA ELEMENT GROUP GOAL*  [ $ | AMOUNT ] [ USD | SPEND ]  [⊕ | TOTAL]

620 — ENABLE AUTO ALLOCATION ACROSS DATA ELEMENTS  ⦿ ON  ◯ OFF

510 —

600

ALL CAMPAIGNS/ SAMPLE CAMPAIGN/ NEW DATA ELEMENT GROUP

NEW DATA ELEMENT GROUP

| GENERAL | BID & OPTIMIZATION | DATA ELEMENTS |

DELIVERY

705 — FREQUENCY CAPPING  ◯ YES  ◉ NO

BILLING

710 — PRICE  $ [CPM AMOUNT] [USD]

715 — BUYER MARGIN  [PERCENTAGE] [% OF MEDIA COSTS AND VENDOR FEES]

720 — PASS-THROUGH COST  $ [CPM AMOUNT] [USD]  CPM

| ALL CAMPAIGNS/ 888 HOLDINGS, VIDEO EU, 2014 | / TOYOTA INTENDERS DATA ELEMENT GROUP I |

NEW DATA ELEMENT

| DATA ELEMENT SUMMARY | GENERAL | INVENTORY | TARGETING | CREATIVES | BID & OPTIMIZATION |

GENERAL OPTIONS

1005 — STATUS ◉ PAUSED ○ LIVE

1010 — DATA ELEMENT NAMES* [NEW DATA ELEMENT]

1015 — DATA ELEMENT GROUP [TOYOTA INTENDERS DATA ELEMENT GROUP I]

NOTES [ ]

1020 — START #1* [📅▼] [MM/DD/YYYY] [🕐] [12:00 AM] ET
END #1* [📅▼] [MM/DD/YYYY] [🕐] [11:59 PM] ET
[+ FLIGHT]

1025 — GOAL #1* [# OF IMPRESSIONS] [IMPRESSIONS ⇕]
[+ GOAL]

1030 — MINIMUM GOAL ◉ YES ○ NO
[# OF IMPRESSIONS] [IMPRESSIONS ⇕] [TOTAL]

FIG. 10

```
NEW DATA ELEMENT
┌──────────────────────┬─────────┬───────────┬──────────┬──────────┬──────────────────┐
│ DATA ELEMENT SUMMARY │ GENERAL │ INVENTORY │ TARGETING │ CREATIVES │ BID & OPTIMIZATION │
└──────────────────────┴─────────┴───────────┴──────────┴──────────┴──────────────────┘
```

NOTE: BID AND OPTIMIZATION SELECTIONS ARE SET AT THE DATA ELEMENT GROUP LEVEL ✕

MARKETPLACE OPTIMIZATION

1105 — OPTIMIZATION ◉ ON ○ MANUAL ◉ OFF

1110 — TARGET ECPM*  [$] [ 12 ] [USD] [DATA ELEMENT SPEND]

AVAILABLE OBJECTIVES — 1115

AUDIENCE EXPOSURE
  IN TARGET IMPRESSIONS    [✕ REMOVE]
BRAND AWARENESS
  COMPLETION RATE    [+ADD]
CONSIDERATION
  CTR    [+ADD]

MY SELECTIONS — 1117

+ PRIMARY OBJECTIVE, AUDIENCE EXPOSURE    ✕

[IN TARGET IMPRESSIONS] [FEMALE] [18] [49] [NIELSON OCR]

*FIG. 11A*

| NEW DATA ELEMENT | | | | | | |
|---|---|---|---|---|---|---|
| DATA ELEMENT SUMMARY | GENERAL | INVENTORY | TARGETING | CREATIVES | BID & OPTIMIZATION | |

NOTE: BID AND OPTIMIZATION SELECTIONS ARE SET AT THE DATA ELEMENT GROUP LEVEL ✕

MARKETPLACE OPTIMIZATION

1105 — OPTIMIZATION ⊙ ON ◯ MANUAL ⊙ OFF

1120 — MEDIA BID* [ $ ] [ CPM AMOUNT ] [ USD ]

DIRECT INVENTORY AD PRIORITY

AD PRIORITY* [ SELECT ▾ ]

NEW DATA ELEMENT GROUP

| GENERAL | BID & OPTIMIZATION | DATA ELEMENTS |

NOTE BID & OPTIMIZATION SELECTIONS APPLY TO ALL DATA ELEMENTS; DATA ELEMENT GROUP GOAL NEEDS TO BE AUTO ALLOCATED ACROSS CHILD DATA ELEMENTS MANUALLY IN THE DATA ELEMENTS TAB

MARKETPLACE OPTIMIZATION
OPTIMIZATION  ◉ ON   ○ MANUAL   ○ OFF
TARGET ECPM*  $ [ECPM AVAILABLE]  USD  [DATA ELEMENT SPEND ⇅]

☑ PURCHASE FUNNEL OBJECTIVES — 1434

AUDIENCE EXPOSURE  ⌄
IN TARGET  [ ✕ REMOVE ]
IMPRESSIONS
BRAND AWARENESS  ⌄
COMPLETION RATE  [ +ADD ]
CONSIDERATION  ⌄
CTR  [ +ADD ]

☑ CONVERSION OBJECTIVES — 1405

EVENT TYPE  ⌄
[EVENT TYPE: 25 AVAILABLE] — 1410
DATE RANGE  ⌄
[ 📅 06/13/14 - 06/13/15 ] — 1415
[ ✓ APPLY ]

MY SELECTIONS
[ + PRIMARY OBJECTIVE, CONVERSIONS ]
[ HOME PAGE CLICK EVENT ]
[ SIGNUP CLICK EVENT ]
[ COKE BRANDING ]
                                              ✕
[                                              ]
[ + NEW OBJECTIVE ]
                          — 1432

[ SAVE & EXIT ]  [ CANCEL ]

☑ DELIVERY — 1420
FORECAST SUPPLY CURVE    MAX ECPM $15.30
300K
200K
100K                     — 1425
0K
   $0  $4  $8  $12 $16 $20
ACTUAL TO DATE  FORECAST — 1430
ROI          99%    1.33K%↑
IMPRESSIONS  40,000    40,000
• ECPM       $24.19    $15.00
• SPEND      $1,300    $15.00
COMP RATES   79%       79%
CTR          2.4%      10%

☑ AUDIENCE
SUMMARY METRICS   DETAIL METRICS
    32%              67%
ACTUAL TO DATE    FORECAST
% IN-TARGET, MALE 18-24
             ACTUAL TO DATE   FORECAST
IN TARGET    62%              67%
IMPRESSIONS  164,778          199,527
UNIQUE       11,335           12,137
REACH        2.3%             2.6%
AVG. FREQ    2.1              2.5
ECPM         22.21            24.21

SYSTEMS AND METHODS FOR PRIORITY-BASED OPTIMIZATION OF DATA ELEMENT UTILIZATION

CROSS-REFERENCE TO RELATED APPLICATION(S)

This patent application is a continuation of, and claims the benefit of priority to U.S. Non-provisional patent application Ser. No. 14/861,888, filed on Sep. 22, 2015, the entirety of which is incorporated herein by reference.

TECHNICAL FIELD

The disclosure generally relates to the field of data element optimization. More specifically, the disclosure relates to priority-based optimization of data element usage.

BACKGROUND

Conventional data element optimization is a complex and time consuming process, and is often not quantified. For example, producers of online videos and other data elements (e.g., electronic or online ads or creatives) promoting products and/or services may have a limited budget. Based on limited data, the producers may choose to use one promotional data element more often than another, but this decision is often based on subjective feelings about the merits of the data element's content.

Further, producers of data elements often have a plurality of objectives and constraints associated with the promotion of products and services. Prioritizing the objectives relative to each other while meeting all constraints is difficult, if not impossible, in real time.

SUMMARY OF THE DISCLOSURE

Systems and methods are disclosed for optimizing distribution of resources to data elements, and may comprise receiving a selection of a first objective and a second objective, the first objective and second objective comprising goals associated with distribution of a plurality of data elements; receiving an indication that the first objective has a higher priority than the second objective; receiving a first goal metric associated with the first objective and a second goal metric associated with the second objective; determining a first forecasted metric based on the first goal metric associated with the first objective; determining a second forecasted metric based on the second goal metric associated with the second objective; and allocating resources for the distribution of a plurality of data elements based on the first goal metric, the second goal metric, the first forecasted metric, the second forecasted metric, and the indication that the first objective has a higher priority than the second objective.

Systems and methods disclosed herein may further receive a selection of a first objective by receiving a selection of one of a plurality of key performance indicators.

Systems and methods disclosed herein may further allocate resources for the distribution of the plurality of data elements by determining an impression price associated with publication of one or more of the plurality of data elements, wherein the determined impression price corresponds to the degree to which the first goal metric and second goal metric are to be achieved.

Systems and methods disclosed herein may further receive a selection of a third objective; receiving a third goal metric associated with the third objective; determining a third forecasted metric based on the third goal metric; and reallocating resources for the distribution of a plurality of data elements based on the first goal metric, the second goal metric, the first forecasted metric, the second forecasted metric, the third goal metric, the third forecasted metric, and the indication that the first objective has a higher priority than the second objective.

Systems and methods disclosed herein may further comprise determining a theme associated with the first objective; and based on the determined theme, disallowing selection of any key performance indicator as the second objective that is not associated with the determined theme.

Systems and methods disclosed herein may further comprise, when the first objective corresponds to an objective category associated with a plurality of key performance indicators: receiving a selection of one of the plurality of key performance indicators as the first objective; and disallowing selection of any remaining key performance indicators associated with the objective category as the second objective.

Systems and methods disclosed herein may further comprise determining a priority multiplier based on the indication that the first objective has a higher priority than the second objective, wherein the priority multiplier is based on the degree of higher priority that the first objective has over the second objective; and applying the priority multiplier when allocating resources for the distribution of a plurality of data elements.

Systems and methods disclosed herein may further comprise receiving a modification in the selection of the first objective or the first goal metric; and reallocating resources for the distribution of the plurality of data elements based on the modification in the selection of the first objective or the first goal metric.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF DRAWINGS

The accompanying drawings, which are incorporated in and constitute a part of this specification, illustrate various exemplary embodiments and together with the description, serve to explain the principles of the disclosed embodiments.

FIG. 5 is an example user interface displaying data elements and data element groups.

FIG. 6 is an example user interface enabling the creation of one or more data element groups according to techniques presented herein.

FIG. 7 is an example user interface enabling the creation of one or more data element groups according to techniques presented herein.

FIG. 8 is an example user interface enabling the selection of objectives associated with groups of data elements according to techniques presented herein.

FIG. 10 is an example user interface enabling the creation and/or selection of data elements that may be associated with a data element group.

FIGS. 11A-11C are example user interfaces for optimizing data element usage according to techniques presented herein.

FIG. 14 is an example user interface enabling the selection of objectives associated with groups of data elements according to techniques presented herein.

DETAILED DESCRIPTION

Reference will now be made in detail to the exemplary embodiments of the disclosure, examples of which are illustrated in the accompanying drawings. Wherever possible, the same reference numbers will be used throughout the drawings to refer to the same or like parts.

Figure 1:
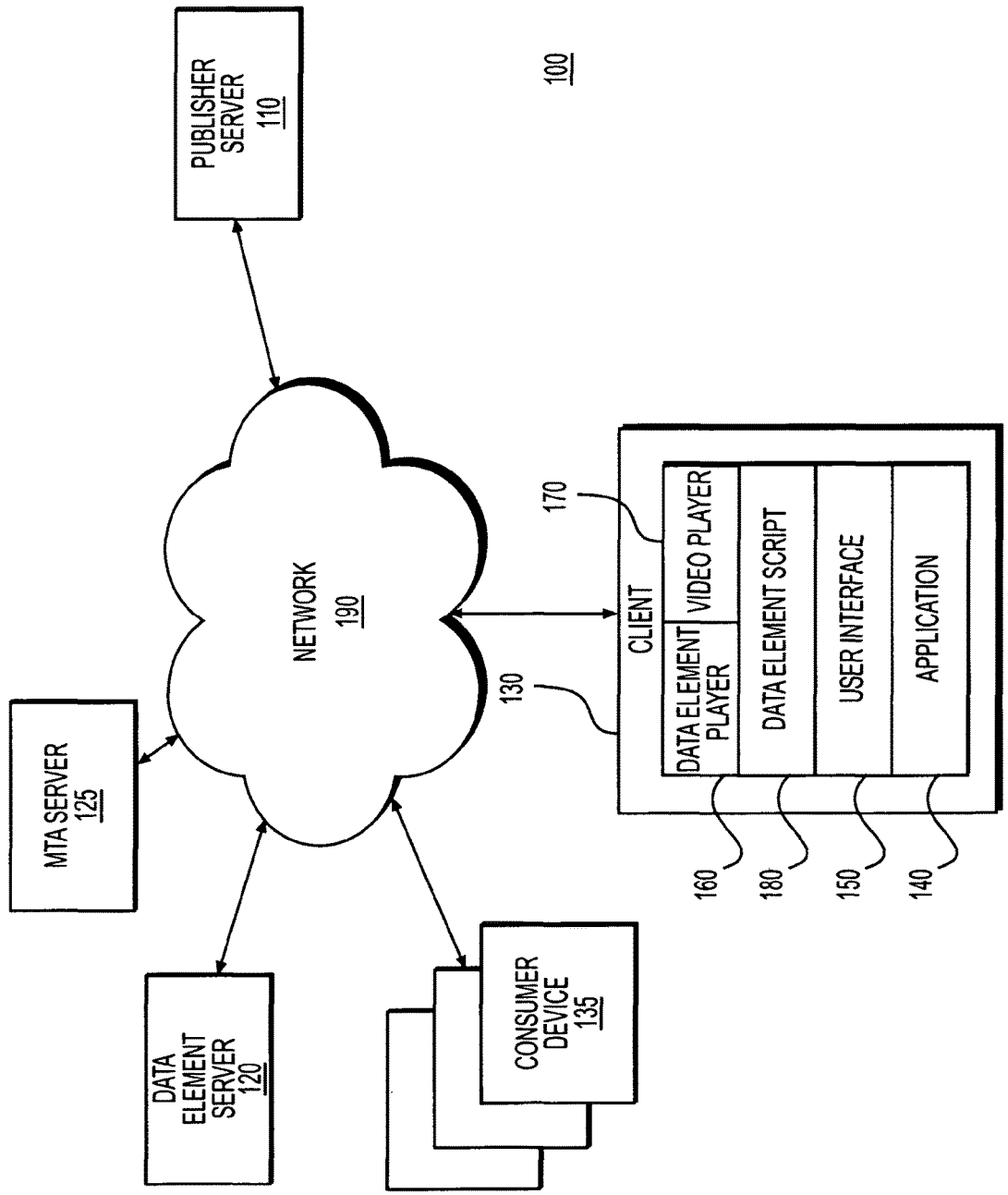
FIG. 1 is a high-level block diagram illustrating a system for dynamically optimizing the use of data elements in accordance with objectives and constraints.

FIG. 1 is a high-level block diagram of a computing environment 100 for dynamically optimizing data elements according to one embodiment. The computing environment 100 may include a publisher server 110, a data element server 120 (or "ad server"), a multi-touch attribution ("MTA") server 125, any number of consumer devices 135, and any number of client devices 130 communicatively coupled by a network 190, such as the Internet. In one embodiment, the publisher server 110, the data element server 120, and the MTA server 125 may be web servers. In another embodiment, the publisher server 110 and/or MTA server 125 may be application servers that provide an instance of one or more applications 140 to the client device 130. In yet another embodiment, the publisher server 110, data element server 120 and/or MTA server 125 may provide data to support the execution of the one or more applications 140 on the client 130. The client device 130 is a computer or other electronic device which may be used by one or more users to perform activities which may include browsing web pages on the network 190, or using the one or more applications 140. The client device 130, for example, may be a personal computer, personal digital assistant (PDA), or a mobile telephone. Only one publisher server 110, one data element server 120, one MTA server 125, and one client device 130 are shown in FIG. 1 in order to simplify and clarify the description. Other embodiments of the computing environment 100 may include any number of publisher servers 110, data element servers 120, MTA servers 125, and/or client devices 130 connected to the network 190. Further, while the publisher server 110 and data element server 120 are depicted as separate in the example of FIG. 1, the features of the publisher server 110, data element server 120, and MTA server 125 may be integrated into a single device on the network 190. The MTA server 125 may provide multi-touch attribution services, as will be discussed further herein.

The network 190 represents the communication pathways between (e.g., communicatively coupled) the publisher server 110, data element server 120, MTA server 125, and client device 130. In one embodiment, the network 190 is the Internet. The network 190 may also include dedicated or private communications links that are not necessarily a part of the Internet. In one embodiment, the network 190 uses various communications technologies and/or protocols. Thus, the network 190 may include links using technologies such as Ethernet, 802.11, integrated services digital network (ISDN), digital subscriber line (DSL), asynchronous transfer mode (ATM), etc. Similarly, the networking protocols used on the network 190 may include the transmission control protocol/Internet protocol (TCP/IP), the hypertext transport protocol (HTTP), the simple mail transfer protocol (SMTP), the file transfer protocol (FTP), etc. The data exchanged over the network 190 can be represented using technologies and/or formats including the hypertext markup language (HTML), the extensible markup language (XML), etc. In addition, all or some of links may be encrypted using encryption technologies such as the secure sockets layer (SSL), transport layer security (TLS), secure HTTP (HTTPS), and/or virtual private networks (VPNs). In another embodiment, the entities may use custom and/or dedicated data communications technologies instead of, or in addition to, the ones described above.

As shown in FIG. 1, client device 130 may execute an application 140, such as a web application or browser, that allows a user to retrieve and view content stored on other computers or servers on the network 190. The application 140 may also allow the user to submit information to other computers on the network 190, such as through user interfaces 150, web pages, application program interfaces (APIs), and/or other data portals. In one embodiment, the application 140 is a web browser, such as MICROSOFT INTERNET EXPLORER or MOZILLA FIREFOX. The application 140 may support technologies including JavaScript, ActionScript, and other scripting languages that allow the client device 130 to perform actions in response to scripts and other data sent to the application via the network 190. The application 140, as further discussed herein, may also utilize data and/or other services from MTA server 125. In some embodiments, functions ascribed herein to the application 140 are implemented via plug-ins such as ADOBE FLASH. In some embodiments, the application 140 may present a demand-side platform ("DSP") to users (which may be authorized users), which enables would-be advertisers or agents thereof to purchase ad space.

Any number of consumer devices 135 may also connect to the network 190, which may enable consumers of network content to view data elements such as advertisements distributed using the application 140. While the client device 130 is depicted as having a data element player 160, video player 170, and data element script 180, these entities and more may be present on any or all of the consumer devices 135. In addition, many of the attributes and behavior of a client device 130 may be also present or implemented on the consumer device 135.

The publisher server 110 may deliver data associated with a user interface 150, such as a web page, to the application 140 over the network 190. The publisher server 110 may also communicate with MTA server 125, and act as a relay for information between the application 140 and the MTA server 125, including information which may be utilized when rendering a user interface 150. The application 140 may then load the user interface 150 and present it to the user. User interface 150 may correspond to any of the user interfaces discussed herein, and any of the user interfaces which may be displayed by application 140. The user interface 150 may include a video player 170 for presenting online videos and a data element player 160 which may present electronic advertisements and/or other promotional materials to the user of client device 130 and/or consumer using the consumer device 135. The data element player 160 may be used to display any of the data elements discussed herein to a user. The video player 170 can be any video player suitable for online video such as WINDOWS MEDIA PLAYER, REALPLAYER, QUICKTIME, WINAMP, or any number of custom video players built to run on a suitable platform such as the Adobe Flash platform.

The data element player 160 may comprise JavaScript, ActionScript and/or other code executable by the application 140 that may be delivered to the client device 130 in addition to or as part of the user interface 150. A data element script 180 may contain code readable and/or transformable by the data element player 160 into operational instructions that govern behavior of the data element player 160. The application may execute the data element player 160 natively, directly (e.g., as JavaScript) or via a browser plug-in module (e.g., as a Flash plug-in). The data element player 160 may communicate with the data element server 120 over the network 190 to request and receive content for presentation on the client device 130. A data element may comprise any computer-executable code (e.g., JavaScript, ActionScript, Flash, or HTML) whose execution may result in the presentation of text, images, and/or sounds to the user. The text, images, and/or sounds may promote one or more products, services, viewpoints and/or actions. A data element can be a linear data element (i.e., promotional content that interrupts the presentation of a video) or a non-linear data element (i.e., promotional content that is presented concurrently with a video) presented either before, during, or after the video. A data element can also be textual, graphical (such as a banner promotion), or a video promotion. A data element can be presented as overlaying the online video or in any other position within the user interface 150. A data element can also be interactive and, in one embodiment, a data element can transition from one of the aforementioned varieties of promotional data elements to a different variety or trigger an additional data element in response to an action by the user of client 130 or consumer using a consumer device 135.

The MTA server 125 may provide multi-touch attribution data and/or functionality to the one or more applications 140. Consumer decisions are often complex, and cannot be attributed to a single source. If a consumer purchases a particular model of a car, for example, that decision may be the result of many factors. There may have been many magazine articles, web advertisements, video reviews, and other factors (or "touches") that led to that decision. Multi-touch attribution, as disclosed herein, allows for tracking and analysis of these factors, which allows for a more granular understanding of consumer behavior, and return on investment ("ROI") determinations that were not possible prior to the Internet.

Software code may be associated with or embedded in advertisements, articles, videos, audio, or any form of consumer multimedia. The code may collect multi-touch attribution ("MTA") data on the consumers views, mouse clicks, searches, listening preferences, and/or other behaviors, and make it available to an MTA server 125, or other devices. This MTA data may be used for analyzing the behavior of the users of electronic devices, and may further be used to analyze consumer behavior in order to optimize advertising. Multi-touch analysis may be performed, whether on the MTA server or elsewhere, using any number of algorithms which may apply weights to each touch. The weights may be applied in any number of ways. For example, all consumer exposures to car-related media may be weighted equally. Exposures further back in time may be weighted less, first exposures may be weighted more, proactive exposures may be weighted more (e.g., the consumer searches for the car in a browser), and/or concentrated exposures in the exposure timeline may be weighted more, etc. Using the MTA data and any applied weights, an ROI may be calculated, which may be based on costs, such as in advertising costs, and the conversion data. Using historical MTA data, ROI may be forecast, for example by the MTA server 125, publisher server 110, and/or client device 130, as will be discussed further herein.

Figure 2:
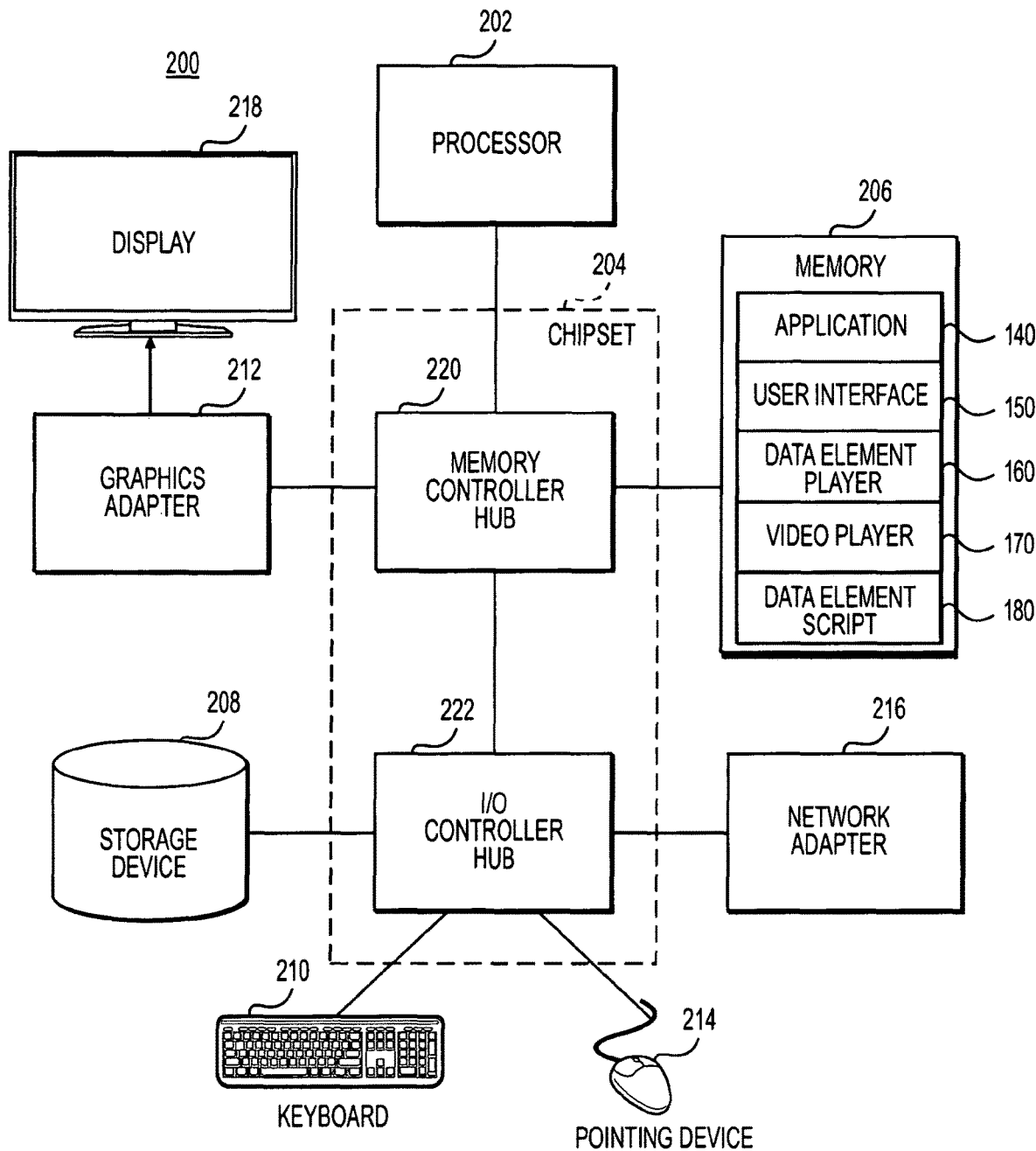
FIG. 2 is a high-level block diagram illustrating an example of a computer for use as a server and/or as a client according to techniques presented herein.

FIG. 2 is a high-level block diagram illustrating on example of a computer 200 for use as a client device 130, consumer device 135, and/or as a server, such as a publisher server 110, a data element server 120, or an MTA server 125. Illustrated are at least one processor 202 coupled to a chipset 204. The chipset 204 may include a memory controller hub 220 and/or an input/output (I/O) controller hub 222. A memory 206 and a graphics adapter 212 may be coupled to the memory controller hub 220, and a display 218 is coupled to the graphics adapter 212. A storage device 208, keyboard 210, pointing device 214, and network adapter 216 may be coupled to the I/O controller hub 222. Other embodiments of the computer 200 have different architectures. For example, the memory 206 may be directly coupled to the processor 202 in some embodiments.

The computer 200 may be adapted to execute computer program modules for providing the functionality described herein. As used herein, the term "module" refers to computer program logic configured and used to provide the specified functionality. Thus, a module can be implemented in hardware, firmware, and/or software. In one embodiment, program modules are stored on the storage device 208, loaded into the memory 206, and executed by the processor 202. The storage device 208 is a computer-readable storage medium such as a hard drive, compact disk read-only memory (CD-ROM), DVD, or a solid-state memory device. The memory 206 is also a computer-readable storage medium and stores computer-executable instructions and data used by the processor 202.

In one embodiment, the memory 206 stores computer-executable instructions that cause the processor 202 to implement a method for displaying data elements. The computer-executable instructions stored by the memory comprise instructions for the application 140. In one embodiment, after delivery of the user interface 150 and data element script 180 to the client device 130 by the publisher server 110, the computer-executable instructions stored by the memory 206 further comprise instructions for the user interface 150, the data element player 160, the video player 170, and the data element script 180 as shown in FIG. 2.

The pointing device 214 may be a mouse, track ball, touch screen, or other type of pointing device, and is used in combination with the keyboard 210 to input data into the computer system 200. The graphics adapter 212 displays images and other information on the display 218. The network adapter 216 couples the computer system 200 to the network 190. Some embodiments of the computer 200 have different and/or other components than those shown in FIG. 2.

The types of computers 200 used by the entities of FIG. 1 can vary depending upon the embodiment and the processing power required by the entity. For example, a client device 130 that is a mobile telephone typically has limited processing power, a small display 218, and might lack a pointing device 214. A server providing a data element server 120, in contrast, might comprise multiple servers working together to provide the functionality described herein. Also, a server typically lacks hardware such as the graphics adapter 212, the display 218, and user input devices.

Some portions of the above description describe embodiments in terms of algorithms and symbolic representations of operations on information. For example, the description corresponding to FIGS. 2-12 relate to techniques that optimize data element usage. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to depict to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Software and firmware configurations of the modules and corresponding instructions described above can be stored in, for example, the storage device 208 and/or the memory 206 and can be executed by, for example, the processor 202, adapters 212, 216, controllers 220, 222, and/or multiple such devices operating in parallel.

Figure 3:
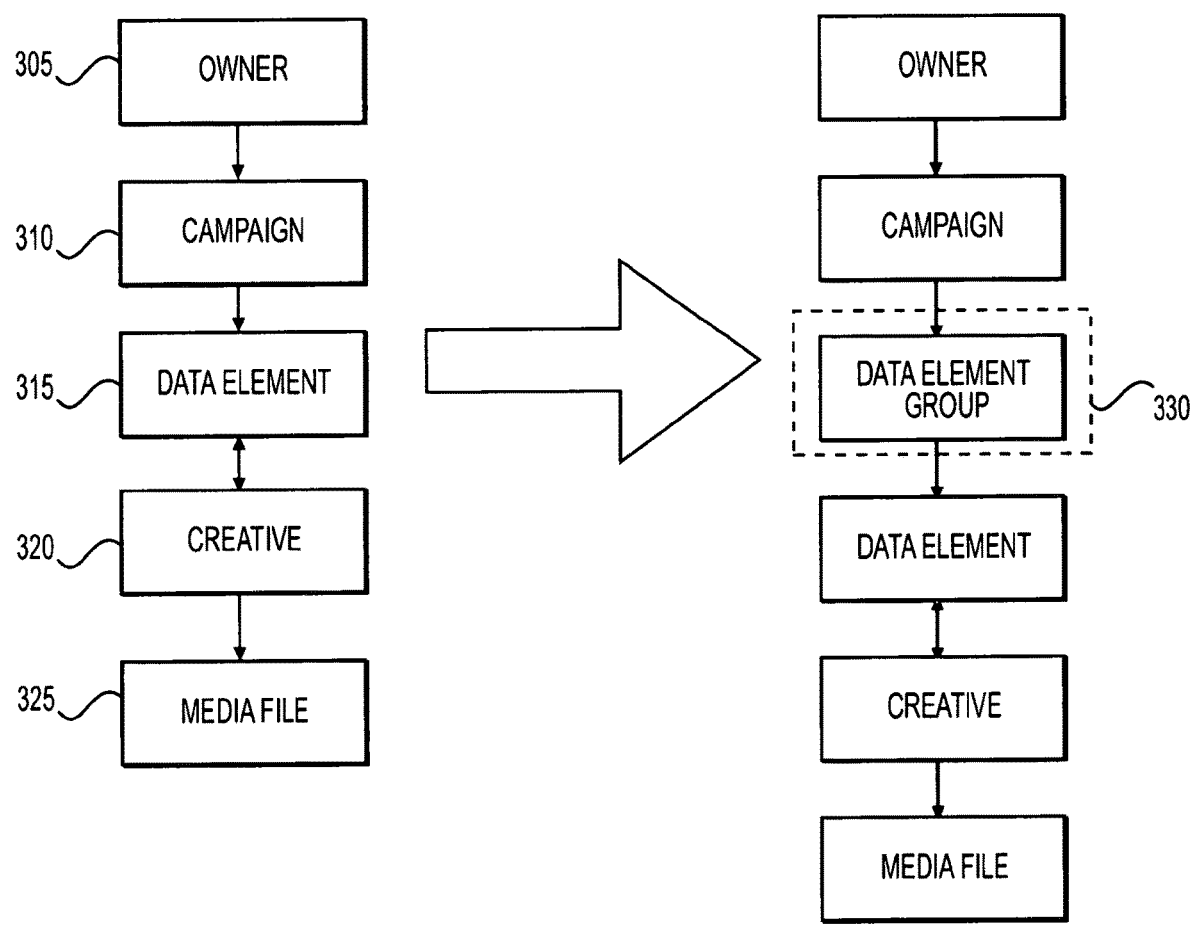
FIG. 3 is a block diagram illustrating an example object hierarchy according to techniques presented herein.

FIG. 3 illustrates a block diagram of an object hierarchy according to techniques presented herein. In one technique, an owner 305, who may be a creator and/or producer of data elements, such as promotional data elements, and may be a buyer of promotional space, may manage or otherwise own one or more campaigns 310. In general herein, a user of the application 140 and/or client device 130 will be referred to as a "user," though the user may or may not be the owner 305 (the user may be, for example, an advertiser running campaign via client 130). A campaign 310 may be a collection of one or more data elements 315 that share a common idea or theme. As discussed above, a data element 315 may comprise any computer-executable code whose execution may result in the presentation of text, images, and/or sounds to the user. Each data element 315 may further comprise one or more creatives 320, each of which may correspond to at least a portion of the text, images, and/or sounds presented to the user. Finally, each creative 320 may further comprise one or more media files 325, such as textual, image, and/or audio files.

In another technique, data elements may be organized into one or more data element groups 330. The data element group 330 may enable users to more effectively plan and optimize the meeting of constraints relating to data elements that share common objectives and/or budgets. For example, a user may have a business objective of programming allocating resources, such as a budget, across promotional data elements in the most cost-effective manner. The data element group 330 object may allow the owner to organize groups of data elements 315 that share one or more common objectives. While one campaign may be associated with a plurality of data element groups, the application may enforce a rule that data element groups cannot be shared across multiple campaigns. Further, the application may require that at least one data element 315 be associated with a data element group 330. While data elements 315 may be associated with a data element group 330, the application may allow data elements 315 to remain unassociated with a data element group 330.

As will be shown, techniques discussed herein may allow an owner 305 to monitor data element group 330 performance via one or more user interfaces 150. Owners 305 may be able to forecast supply, pricing, and performance associated with data elements 315 and data element groups 330. Owners may also be able to programmatically optimize budget allocation across data elements that perform the best according to one or more objectives and/or one or more constraints. Owners may further be able to manually optimize allocations of resources, and may allocate more resources, such as a budget, to better performing data elements. Owners may also be able to run reports against data element group performance, further enabling the selection of the most effective data elements for reaching a given set of objectives and constraints.

Figure 4:
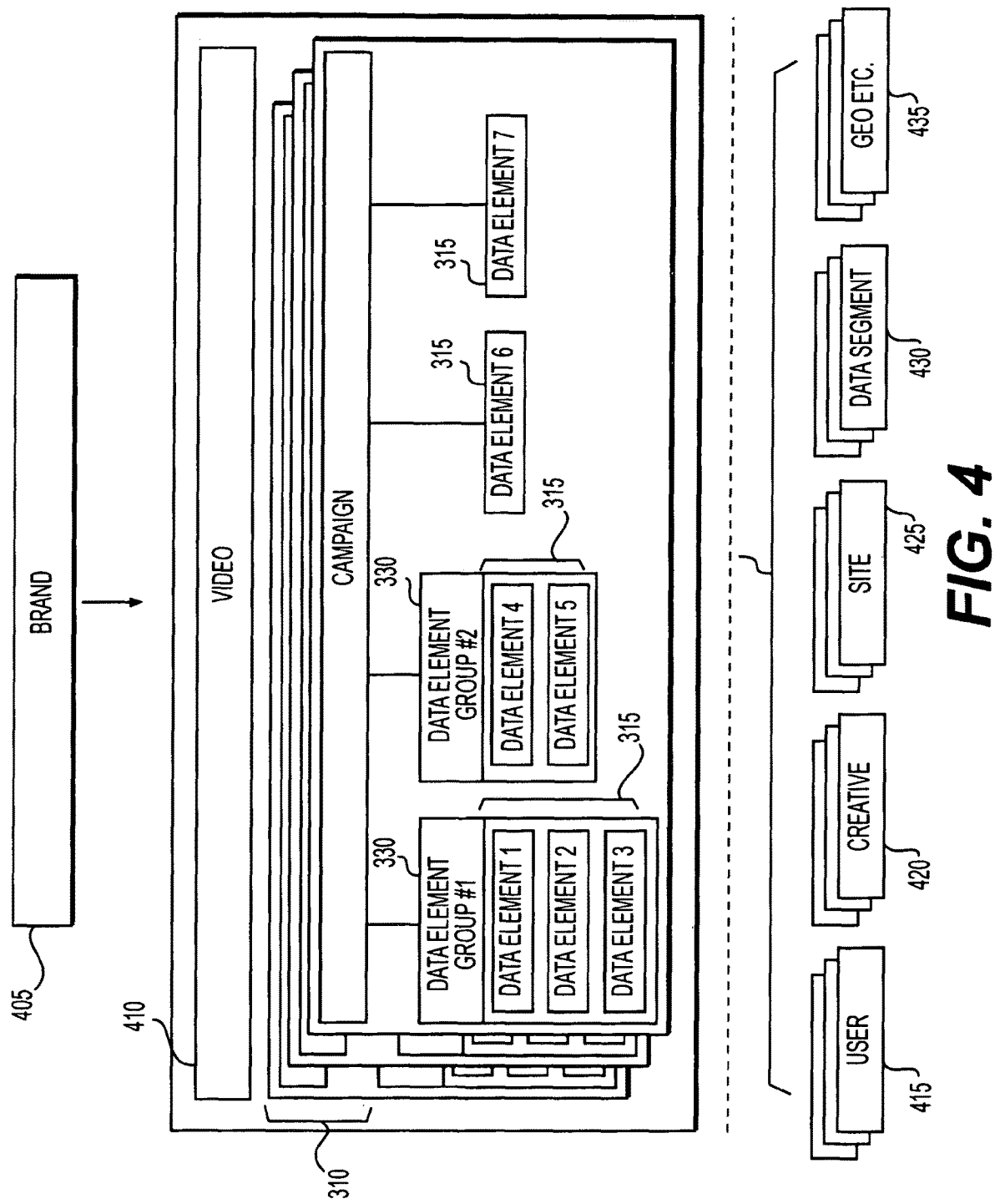
FIG. 4 is a block diagram illustrating an example of the grouping of data elements into data element groups according to techniques presented herein.

FIG. 4 is a block diagram illustrating an example of the grouping of data elements into data element groups according to techniques presented herein. As discussed above, data elements may be used as promotional content, and may be associated with a brand 405. The medium for the presentation of promotional content may be video 410, although other mediums would be consistent with techniques presented herein. A given brand 405 may have a one or more associated campaigns 310. Each campaign 310 may, in turn, have any number of data element groups 330 and any number of data elements 315 associated therewith. Constraints may be set at the campaign level, for example, for resource constraints, such as a budget. These constraints may bind objects lower on the object hierarchy, such as individual data element groups 330 and data elements 315. Similarly, constraints set at the data element group level 330 may bind data elements 330 associated with the data element groups 330.

Data element groups 330 may be created by an owner 305, or some other administrator or sufficiently privileged user. Alternatively, data elements may have associated tags and/or properties, and data elements 315 may be automatically grouped into data element groups 330 based upon these tags and/or properties. For example, data elements 315 sharing similar optimization objectives and/or maximum effective cost per thousand impressions ("eCPM") may be grouped under one data element group 330. Forecasts of delivery and/or key performance indicators ("KPIs") may be determined and/or viewed at the data element group 330 level as well at the level of individual data elements within the data element group. Budgets may be automatically allocated across multiple data elements 315 within a given data element group 330.

One or more users 415, which may correspond to one or more owners 305, may access the application in order to create and associate data element groups 330 and data elements 315. The data element groups 330 and data elements 315 may utilize one or more creatives 420, which may be stored in a data store, such as storage device 208. Data element groups 330 and/or data elements 315 may further be utilized in relation to one or more sites 425, such as websites, and segments 430. Sites 425 may be used to target certain topics, for example sports and/or entertainment. Segments 430 may be target audience objects. For example, a data segment 430 object may represent females 18 and over. Data element groups 330 and/or data elements 315 may also be utilized in relation to geographic areas 435. For example, a data element group may contain only promotional data elements that are to be run in a particular geographic region.

As discussed herein, objectives and/or constraints may be optimized in order to meet or exceed the one or more objectives within any constraints. For example, objectives may be to hit a target eCPM for a given budget, to maximize target impressions, to maximize the completion rate, and/or to maximize the click-through rate. Any number of other objectives/goals/KPIs may be used. Optimization, for example of a budget, may occur in multiple ways. Optimization may occur across video channels, for example by optimizing how much of a budget to apportion to each video channel given an assessment of the effectiveness of the channel towards meeting the one or more objectives. Optimization may also occur across multiple campaigns 310, a campaign being a collection of related data elements 315 and/or data element groups 330. One campaign may be determined to be more effective than another campaign in a certain medium or in promoting a certain brand, and resources may be balanced accordingly. Optimization may further occur across data element groups 330 within a given campaign. Some data element groups may prove to be more effective at meeting objectives and constraints than others, and resources may be continually rebalanced accordingly. This optimization may include data elements that are not affiliated with data element groups. Optimization may further occur across data elements, such as the data elements within a given data element group. In this manner, individual data elements that perform better for a given set of objectives and/or constraints may be given more resources or otherwise utilized more frequently. Further, optimization may be applied at the level of creatives, which may comprise a portion or version of a given data element. Optimization may also occur when selecting an optimal price of a bid, if, for example, bidding for space to promote data elements. Thus, optimization may occur at one or many levels of the object hierarchies shown in FIG. 3.

FIG. 5 is an example campaign user interface 500 displaying data elements and data element groups. The campaign user interface 500 may display any campaigns 505 to which the application user has access to view, such as any and all campaigns associated with a given owner 305. The campaign user interface 500 may also display any data element groups and/or independent data elements associated with each campaign. Each campaign 505 may have associated data element groups listed beneath, which may themselves have associated data elements listed beneath. The data element groups, data elements, and campaign listings may be expanded by default, contracted by default, or some items may be expanded or contracted, according to user preference. For example, a user may select that campaigns 505 are expanded, showing all associated data element groups associated therewith, but the data element groups themselves may be contracted by default, such that the user cannot immediately see the data elements associated with each data element group.

The campaign user interface 500 may further display fields associated with each campaign, such as the campaign's name 510, active/inactive status 515, start and end dates 520, pacing 525, impressions 530 (number of times a data element is presented to a member of the target audience), amount spend 535 thus far, bid 540 (which may comprise the average bid for impressions of a promotional data element, or per thousand impressions, etc.), click rate 545, targeting 550, and other options 555.

Pacing 525 may indicate a rate at which data elements are being made available relative to a goal. For example, in advertising, if a data element has a spend goal of $10 over a 10 second period, pacing is 100% if $10 is actually spent delivering the data element to an audience during that time. Pacing would be 200% if $20 was spent delivering the data element during that time period, and so on.

Targeting may be a filtering mechanism to make sure that promotional data elements run against a qualified pool of inventory and audience. For example, certain devices (e.g., only tablet computers), platforms (e.g. only Android), topics (e.g., only sites that over index for sports), audience segments (e.g., only females 18 and up), time periods (e.g., only evenings), may be specifically targeted. Techniques discussed herein may attempt to optimize for targeting to find the most valuable impressions for the cost.

A user of application 140 might create a new data element group in the campaign user interface 500 in a number of ways. For example, the user might select "create new" 510 to create a new data element group for association with a certain campaign. A user may also be able to clone an existing data element group, which may clone the data element group and any associated data elements. A user may also be able to create or delete data elements within a data element group, or data elements that are unaffiliated with a data element group.

FIG. 6 is an example user interface 600 allowing the creation of one or more data element groups according to techniques presented herein. When a user selects to create a new data element group, user interface 600 may be displayed, where a user may be able to select general settings, objectives, and/or constraints for the data element group. These selections may automatically propagate to any data elements associated with the data element group. Settings selected in the data element group user interface 600 may be reflected in the campaign user interface 500.

The user may also select a status 515 of the data element group, which may reflect whether any data elements in the data element group may be used in the real world, such as for advertising. The data element group may be "paused" by default, such that ad space associated with the data elements of the data element group would not be obtained. If the data element group is set to "live," a user may still be able to individually pause data elements associated with the data element group.

The user may further select a data element group name 510, and may designate any notes or comments 605 about the data element group. The user may also select one or more start and end dates 607 of the data element group, which may represent dates promotional data elements may run in one or more forms of media. Additional start and end dates may be designated, such as by selecting a flight option 610. As used herein, a period between a start and end date may be known as a "flight."

The user may also designate a data element group goal 615, which may indicate a total budget (spend total) for the data element group. The user may also be able to switch auto-allocation 620 on and off, which enables automatic optimization of data elements associated with the data element group, as will be further described herein. The objectives may be optimized across data elements of the data element group based on "mid-flight" metrics or other performance data. Once a minimum level of performance data is obtained, usage of a given data element and budget associated therewith may be refined at regular time intervals, such as daily. If the user turns off automatic allocation 620, the user may still be able to manually allocate data element goals for data elements, for example in the data elements tab.

Goals or objectives set at the data element group level may be set to adhere to goals set at higher object levels, such as at the campaign level. For example, start and end date ranges 607 may be prohibited from going outside of any start or end date ranges set at the campaign level. The spend total may be set to be equal to or less than the spend total set at the campaign level, if set.

As an example, a user may set automatic budget allocation 620 across one or more data element groups and independent data elements, and automatic performance optimization for data element usage within a data element group. Optimization techniques, such as linear programming, may be used to optimize for multiple goals while staying within any number of constraints. The optimization may occur recursively up or down through the object hierarchy. A first constraint set at the campaign level may be a spend goal of $2.5 million. The start and end dates may be set as the month of October, 2014. Based on one or more campaign-level or other constraints, data element groups may be automatically or manually created corresponding to one or more audience segments.

The example campaign may contain any number of data element groups. A first data element group may correspond to would-be buyers of a certain automotive brand. A user may set delivery constraints at the data element group level. For example, the user may set the spend goal for the data element group to be $1 million, and the maximum eCPM to be $15. The user may also set objectives or goals, for example a target audience of females aged 18-49, with a click-through rate goal of 2%.

A second data element group may correspond, for example, to data elements of an automotive marketer. A user may set delivery constraints at the data element group level. For example, the user may set the spend goal for the data element group to be $500,000, and the maximum eCPM to be $10. The user may also set objectives or goals, for example a target audience may be set to adults 18 and over, and a completion rate goal may be set to 85%. As discussed above, individual data elements may be associated with a campaign regardless of whether they are associated with a data element group. For example, the user may create an individual promotional data element with a spend goal of $500, the maximum eCPM of $12, and with an objective of minimizing cost per thousand impressions (CPM). Further, as discussed above, while the campaign may be automatically optimized, a user may manually set budgets of unaffiliated data elements, one or more data element groups and/or individual data elements within groups.

FIG. 7 is an example user interface 700 illustrating further user settings that may be configured when creating a data element group. The user may designate other objectives and/or constraints in addition to budget. For example, the user may designate impression targets or gross data element revenue targets to be automatically optimized. As a restrictive goal, the user may also designate a cap for the frequency 705 that a data element may be used in a campaign. Frequency capping may be managed at the data element group level, and may override frequency capping at the data element level. As noted previously, frequency capping may conform to the frequency capping setting from the campaign object.

Additional constraints may also be set by the user when creating a campaign, data element, or, in the example shown in FIG. 7, a data element group. The user may further set a cost per thousand impressions price cap 710. A buyer margin 715, for example a percentage of media costs and/or vendor fees, and a pass-through cost 720, such as a cost per thousand constraint, may also be designated. Pass-through costs 720 may include other costs and third party fees which may not be otherwise directly logged in application 140. Owners 305 may wish to include pass-through costs to ensure that the media cost numbers, which may be defined as the maximum bid minus any pass-through costs, are realistic. For example, if the maximum bid is $10, but there are $3 in expected data costs, up to $7 is left to be allocated for the media cost. If any of the billing fields are set, they may bind any data elements associated with the data element group. As a result, changing billing fields in the settings of associated data elements may be disabled.

Figure 8:
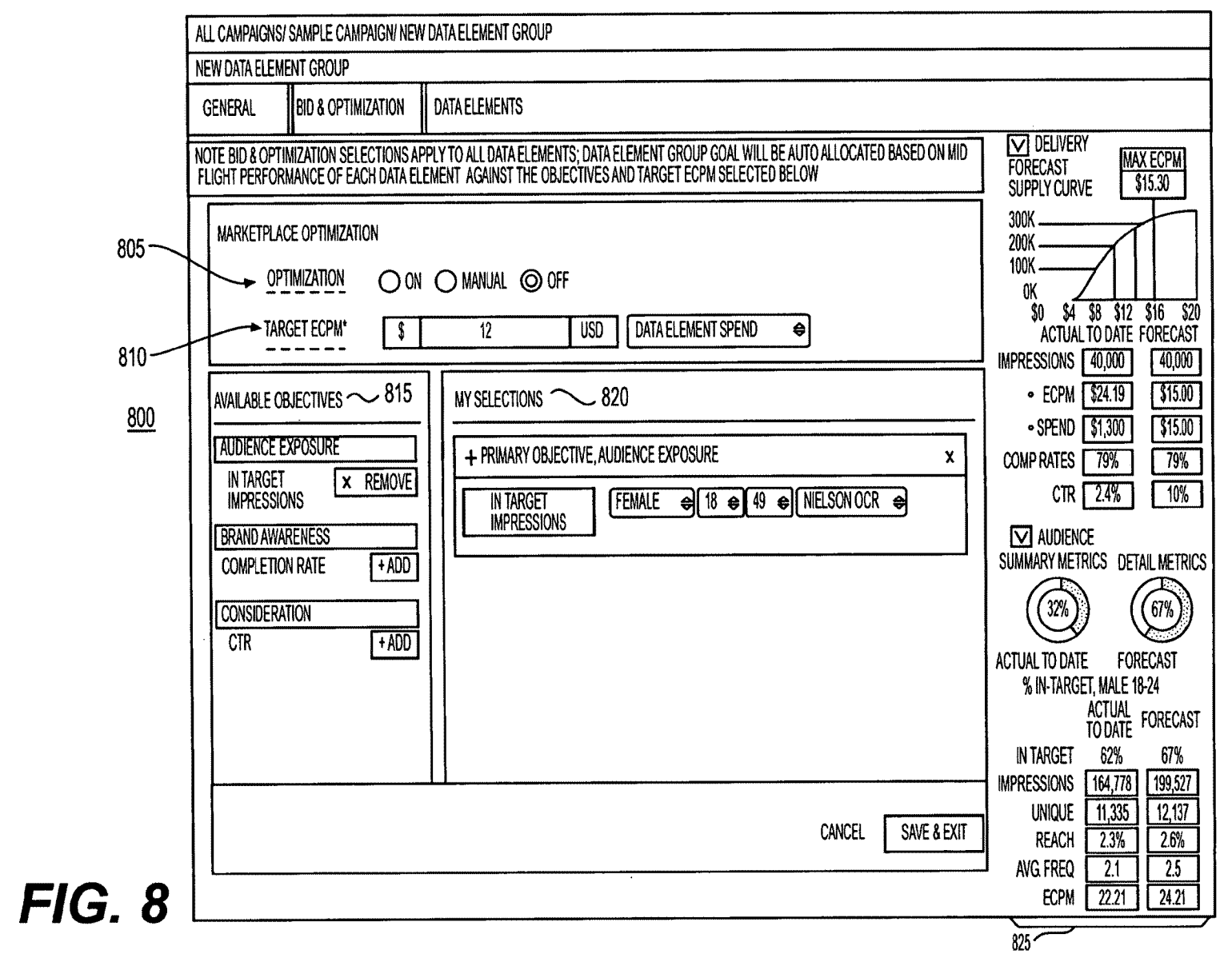

FIG. 8 further illustrates the selection of objectives associated with the creation of a data element group according to techniques presented herein. Selections on the user interface 800 may be automatically applied to one or more data elements associated with the data element group. As discussed above, data element group objectives may be optimized by allocating resources based upon performance of data elements at some predetermined time period after the start of the campaign (i.e. "mid-flight"). The performance of one or more associated data elements may further be determined given any objectives and/or constraints defined in the user interface 800.

The user may select whether optimization 805 for the data element group is set to on, off, or manual. If the data elements are being used for advertising, selecting "on" may mean that the application will automatically deliver impressions based on a real-time marketplace for each data element at the lowest possible price to meet the required objectives of the data element group. Optimization 805 may be turned on by default. In order enable manual or turn off optimization 805 at the data element group level, the user may be required to turn off "Auto Allocation Across Data Elements" in user interface 600. The optimization 805 setting may automatically propagate to all data elements associated with the data element group.

The user may also select a target eCPM 810, which, as indicated by the asterisk, may be a mandatory field. As discussed above, the eCPM 810 is the effective cost per thousand impressions, and may be calculated by dividing total earning for data elements in the data element group by total number of impressions of data elements in the data element group in thousands. Associated data elements or "child data elements" may be unable to use a different target eCPM when data element group optimization 805 is turned on. The target eCPM 810 may be enforced as a restrictive ceiling. If automatic goal allocation 620 is turned off, child data elements may be able to have a different target eCPM as long as they are at or below the target eCPM goal. If automatic goal allocation 620 is turned on, the optimizer may determine the best way to allocate the budget (impression, spend or gross revenue) across any child data elements. Once enabled, a user may be restricted from editing the delivery goal, target eCPM, and/or objectives at the individual data element level.

Multiple objectives 815 may be selected by a user and ranked in the selections list 820. For example, a user may designate a primary objective, a secondary objective, a tertiary objective, etc. The data element group optimization algorithm may take the ranking into account when optimizing allocation of resources across a given set of data elements, given the assigned objectives and constraints. For example, objectives may be assigned varying weights that affect how optimization is performed. Positive factoring may be given to higher priority objectives such that the application 130 may be more likely to bid for space which meets a higher priority objective (within the maximum CPM goal or other constraints), rather than a lower priority objective.

The importance of each objective in a list or hierarchy of objectives may be reflected by the allocated bidding price. The dedicated bidding price allocated for each objective may be a weighted portion of the maximum CPM (or other budgetary constraint), while the weight of each objective may correspond to the priority level (i.e., higher priority objectives may be given higher weights). The assigned budget may also be adjusted by the achievement difficulty and rareness of a given objective.

For example, a user may designate a list of objectives 820. A primary objective may be in-target impressions of females 18 and up, a secondary objective may be a completion rate of at least 80%, and a tertiary objective may be a CTR of at least 1%. The total target eCPM 810 may be $15. Initially, a largest portion, for example 50%, of the eCPM may be automatically allocated to the primary objective, in this case the in-target objective. A second largest portion, such as 33%, may be allocated to the secondary objective. And a smallest portion, such as 17%, may be allocated to the tertiary objective. The bids may then be automatically adjusted by rareness. For example, the average in-target rate may be 25%, so in-target impressions may receive an eCPM of $30. Completed impressions may receive an eCPM of $6.25 (assuming an average completion rate of 80%), and CTR may receive $250 eCPM (assuming an average CTR of 1%).

After the campaign begins, in mid-flight the allocations may be adjusted by achievement difficulty. For example, if the secondary objective average completion rate of 80% is achieved, allocations may be increased to the primary and/or tertiary objectives to increase the likelihoods that they will also be met. In other words, allocations for objectives with a low achievement difficulty may be reduced relative to other objectives with a higher achievement difficulty. This behavior is not necessarily binary. Rather, as a given objective becomes closer to being met, the allocation may be correspondingly reduced.

Figure 9:
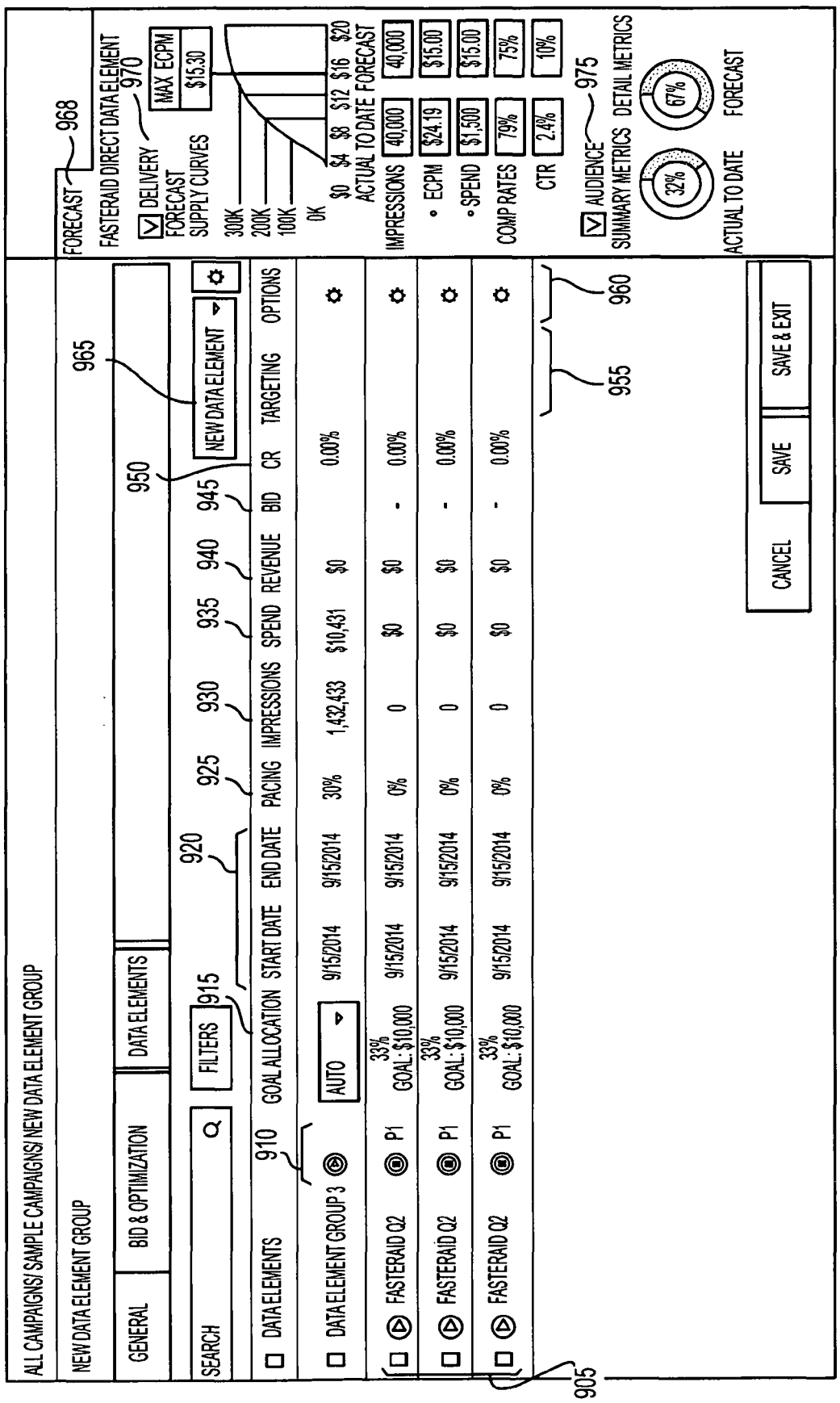
FIG. 9 is an example user interface enabling the creation and/or selection of data elements that may be associated with a data element group.

FIG. 9 is an example user interface 900 further allowing the creation, modification, and/or selection of data elements and attributes that may be associated with the creation of a data element group. The user interface 900 may list data elements associated with the data element group 905. Each data element may have an associated status indicator 910, a goal allocation 915, a start date and end date of use 920, for example if the data elements are advertisements in a campaign, a pacing percentage 925, which determines how promotional data elements are spaced out in time, a number of impressions 930, the spend total 935, the revenue generated 940, the associated bid 945, the click rate 950, the targeting 955, and other options 960 and 965. The user interface 900, along with other user interfaces presented herein, may display a forecasted delivery, such as a supply curve for eCPM. The audience for a selected data element group or data element may also be forecasted 975.

Several of these fields will now be discussed in greater detail. The goal allocation field 915 may determine how much of an available budget is intended to be spent on data elements in the data element group. If the user has selected automatic allocation 620, the default may be set to auto in the goal allocation field 915. The user may be able to set the goal allocation field 915 to manual, which may in turn switch the selection in the automatic allocation field 620 in a corresponding manner. The percentages of the goal allocation field 915 may be required to total 100%. The allocation percentages may be not editable if automatic allocation 620 is enabled, as the percentages would be decided by the optimization features of the application. If a budget has been set at the data element group level, then the budgets of all of the data elements within the data elements may be set to remain equal to or below the data element group total.

If, on the other hand, the goal allocation field 915 is set to manual, a user may be able to adjust the percentages of each data element. As a default, a manual setting may result in the first data element receiving a 100% allocation, which may then be modified by the user. The goal estimate, which may be a dollar amount under the goal allocation field 915, may be not editable by the user, and may be derived only from the percentage designated and the budget of the data element group. The sum of the allocation percentages may be set to total 100%. A user may also be able to allow a portion of the budget to be automatically allocated, and a portion to be manually allocated.

Status indicators 910 may be placed near goal allocation percentages. The status indicators 910 may be colors or symbols, such as green or red, up or down arrows, etc. The status indicators 910 may have a first status if the allocation is increasing (an indication that the data element has been determined to be more effective at reaching objectives than in previous optimization cycles), and another status if the allocation is decreasing (an indication that the data element has been determined to be less effective at reaching objectives than in previous optimization cycles). A third status may also exist if the allocation has not changed in the recent allocation cycle from a prior allocation percentage. For example, if a data element allocation is increasing, the associated status indicator may be green. If the allocation is decreasing, it may be red, and if the allocation is the same or within a predetermined distance from the same allocation, the status indicator may be gray.

A user of the application may be able to add new data elements in one or more ways, such as by clicking a button 965 on the user interface. A user may further be able to edit the settings of each data element, clone a data element (which may be automatically associated with the data element group), and/or delete data elements.

One or more user interfaces presented herein may also display a forecast window 968. A user may be able to toggle between different forecast views. A default view may be an aggregated data element group forecast. An aggregated data element group forecast is a summarized view of all child data elements. Alternatively or in addition, the application may also be able to display a forecast window for individual data elements. In response to a user clicking on an individual data element, the forecast window for the individual data element may be displayed. Similarly, clicking on a data element group may cause the aggregated data element group forecast to be displayed.

The application may also create reports about data element groups and data elements for display. Report keys may comprise one or more of: a data element group, data element group end date, data element group goal or objective, data element goal or objective type, data element group identifier, data element group pricing type, data element group start date, and a data element group type. Similar reports may be generated for individual data elements, for campaigns, or for a group of associated campaigns.

Data element group optimization will now be further discussed. At a high level, data element group optimization may involve a user inputting a strategy. Accordingly, objectives and/or constraints such as flight, budget, performance goals and associated data elements may be defined. The data elements may have a common KPI goal, which will guide the application to allocate the budget accordingly. Once the data element group has been created, promotional data elements may be run, and associated performance data may be collected, for example on a certain time interval such as on a daily basis. The budget may then be assigned across data elements based on the performance data and any constraints or restrictions (e.g. a minimum spend notwithstanding goal). The performance data may allow a determination of which data elements are better meeting the one or more objectives, such as, for example, by attracting higher click rates and/or click-through rates. The budget may be assigned for a subsequent time interval, such as for a day, and it may be reevaluated at each time interval. Alternatively, optimization may be performed in real time. Each data element may be given a training budget such that each data element may have the chance to prove itself effective, for example in an advertising scenario. A statistically significant amount of performance data for a given data element may be required to be collected before a data element's budget may be reduced below a predetermined threshold, such as being reduced to zero. Data element groups may be required to make a first budget allocation to each data element in the group within a predetermined time period, such as within 48 hours of the data element group flight. This process may iteratively loop each time interval until the campaign ends. Over time, as performance data accumulates, the application may become more aggressive in assigning resources such as budget to data elements that prove to be more effective.

For data elements with in-target goals, where there is no feedback loop, it may be assumed that if a data element is using an online campaign ratings (OCR) application, a feedback loop may be used to assess actual performance. If a data element is not using an OCR application, it may be assumed that the optimization estimates were delivered.

Possible features of the data element group optimization algorithm will now be discussed in greater detail. The algorithm may determine the selected goals of the data element group, for example budget desired, cost per thousand cap, KPI goals, flight length, etc. After the data element group has run for a period of time, such as a predetermined time interval, the achieved goals of the data element group may be determined, such as budget delivered, money spent, KPIs delivered, etc. The data element group plan for the next time interval, such as a predetermined time interval cycle, may then be determined. Based on the budget delivered, the minimal training size of the data element group may be determined. Based on the average KPI (supply), the KPI goals (demand), and the indicated priorities, the value of each KPI may be evaluated (the same as controller optimization) as a data element group buying plan. The achieved KPI of each data element in the data element group may then be read, for example, in terms of click counts, completion counts, conversion counts, etc. Achieved KPI performance data may be converted to click rate, completion rate and conversion rate, etc. Based on the achieved KPI of each data element and the determined value of each KPI, the value of each data element towards the data element group may be evaluated. The value may be determined as, for example, by multiplying the KPI of the data element by the buying plan (the buying plan may be a representation of the importance, of each objective) of the data element group. The forecasted KPI of each data element in the next cycle may then be read. Based on a received or determined forecasted KPI, the opportunity risk of the value of the data element dropping may be modeled. The forecasted supply of each data element in the next cycle may then be received or determined. The budget for each data element in the data element group may then be optimized, for example by linear programming. A feasibility region within a range of constraints may be determined, and the optimum distribution of resources may further be determined in part based upon which point in the feasibility region most effectively meets the objectives. In particular, intersection points of constraint lines along edges of the feasibility region may be evaluated. The optimization may be determined, for example, using the following technique:

MAX sum(DEperform*DEbudget)
S.T sum(DEbudget)=DEGgoal
0<=sum(DEbudget*eCPM)<=DEGspend_goal
BOUNDS: DEmingoal<=DEbudget<=DEmaxsupply The objective of these equations may be to maximize the aggregated performance at the data element group level. The DEbudget may represent the budget allocated to each data element in a data element group, while DEperform may represent the performance of each data element. The constraints may be data element group level budget (DEGgoal and DEGspend_goal), and data element level supply (DEmaxsupply) and a data element configuration goal minimum (DEmingoal). The solution may then be provided to the data element level optimizer.

FIG. 10 is an example user interface 1000 configured for enabling creating and/or editing data elements that may be associated with a data element group. After selecting to create a data element in the application 140, such as one associated with a data element group, the user may be shown user interface 1000. The status 1005 of the data element may be shown as either paused or live. If a data element is changed from live to paused mid-flight (during a campaign), a warning message may be displayed, and subsequent action by the application taken, that automatic allocation will be set to 0% in the data element group user interface 900 and elsewhere. The budget may then be re-optimized for any remaining live data elements in the data element group, and/or for any data elements left in the campaign generally. A user may be prohibited from changing the status from live to paused unless he or she has also set the manual goal allocation to 0% in the data element group user interface 900.

The data element name 1010 may be designated by the user. The data element group 1015 associated with the data element may also be indicated. As discussed previously, the data element may inherit pricing and optimization criteria, as well as any other restrictions or constraints set at the data element group level.

A start date and end date 1020 (flight), in the case of published or promotional data elements, may also be displayed and input by the user. Flight dates of individual data elements may be prohibited from falling outside of the one or more flight dates of the parent data element group.

Objectives or goals 1025 may also be designated at the data element level. However, if the data element group optimization is activated, this section may be deactivated. A message may be provided to the user indicating that, to enable data element goal selection, the auto allocation across data elements 620 should be turned off. The data element group optimization algorithm may automatically allocate a subset of the data element group.

If the automatic allocation across data elements 620 is set to on, there may be no specific goals that can be added for the data element. However, the user may be able to determine a minimum level allocation per data element. For example, the user may set the minimum number of impressions that must be provided for the data element, in the case of advertising. The minimum level (along with the combined minimum levels set by other data elements) may be prohibited from exceeding the value set at the data element group level. The minimum goal may be allocated to the data element even if the data element is underperforming relative to other data elements on the selected optimization objectives. Even if a minimum goal is selected, the application optimizer may still designate a higher number if the data element outperforms other data elements in the data element group based on, for example, mid-flight performance.

FIG. 11A is an example user interface 1100 displaying a data element bid and optimization page, which may be associated with the creation and/or editing of data element metadata, according to techniques presented herein. If the associated data element is part of a data element group with optimization 1105 turned on, the user interface 1100 may be non-editable. The user may not be able to change the target eCPM 1110 or any of the objectives 1115. If optimization 1105 is turned on and automatic allocation across data elements 620 is turned on, the user may be enabled to edit the objective 1115 and/or objectives panel 1117. Further, an "objective centric workflow" flag may be enabled to allow the user to select objectives for the objective panel 1117. If, however, automatic goal allocation is set to manual, or turned off, the user may be able to edit the target eCPM and/or objectives 1115. As a result, each data element within a data element group and campaign may be able to have different optimization goals.

As discussed above, optimization may be performed across data element groups 330, as well as across particular data elements 315, regardless of whether they are affiliated with a data element group. The objectives and/or constraints of the data element may be determined, for example, in terms of budget desired, cost per thousand impressions cap, KPI goals, flight length, etc. The achieved goals and/or constraints of the data element may also be determined, for example, in terms of budget delivered, money spent, KPI delivered, etc. The data element budget, cost per thousand impressions cap, etc., may then be determined for the next cycle, where the cycle may be a predetermined period of time. Based on the pacing of the budget goal, e.g., the rate at which the budget is being spent, the base value may be adjusted. Adjusting the base value may help keep pacing at or near 100%. The base value may represent the importance of the pacing objective. Pacing may automatically be given a non-configurable top priority, so the system may calculate a base value first. The importance of each KPI may then be determined based on the average KPI (supply, the KPI goal (demand), and/or any user-indicated priorities. The optimization algorithm may then attempt to maximize the one or more KPIs with respect to cost per thousand impressions.

FIG. 11B is an example user interface 1170 displaying a user interface page which may be presented to the user when optimization 1105 is turned off, or turned to manual. The user may be enabled to designate the Media Bid 1120 manually, which may set the cost per thousand ("CPM") impressions bid price. The user may also be able to designate the Direct Inventory Ad Priority 1125. Other embodiments presented herein may optimize for marketplace bid opportunity, rather than Direct Inventory Ad Priority 1125.

Figure 11C:
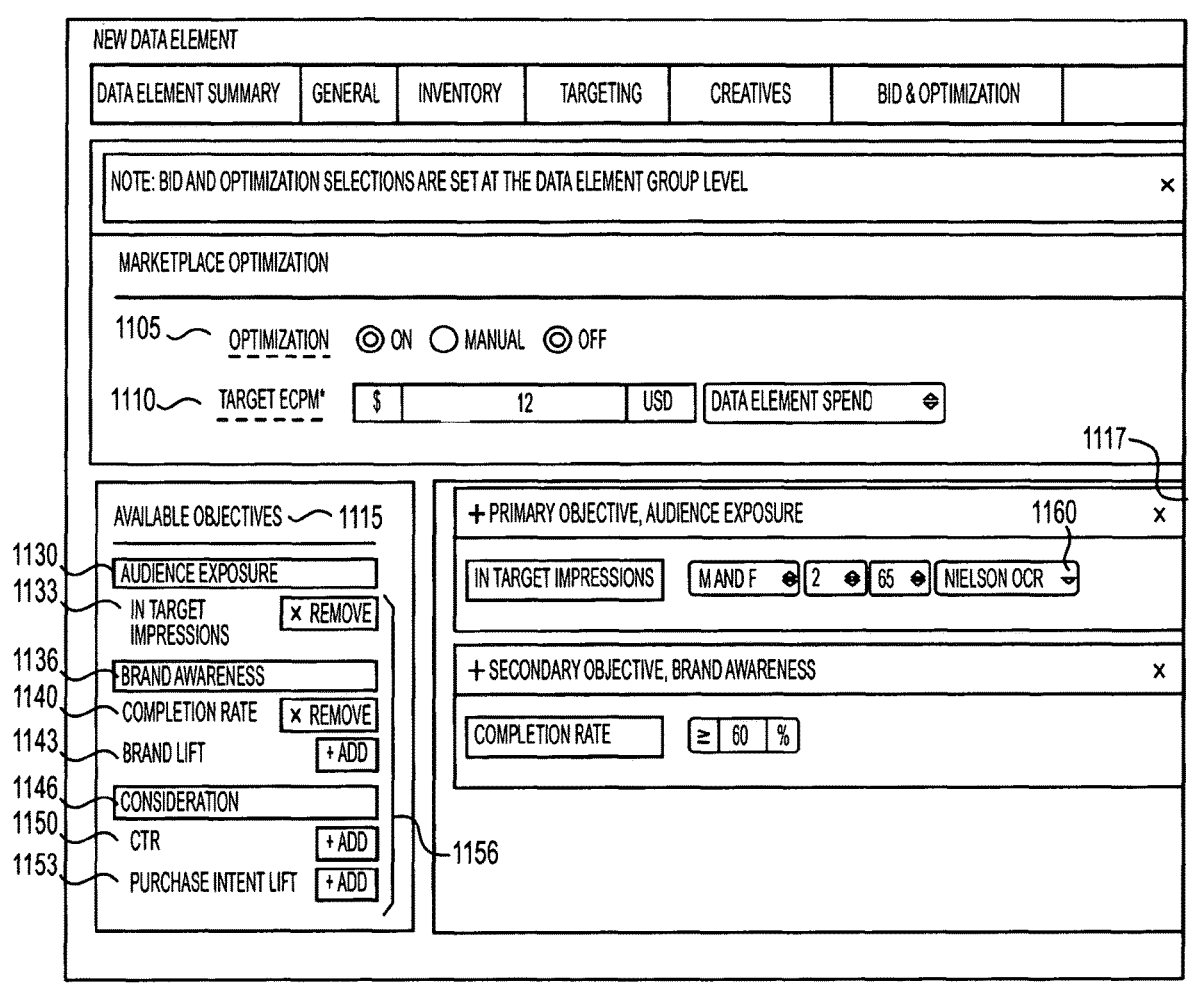

FIG. 11C is an example user interface 1180 displaying a data element bid and optimization page, which may be associated with the creation of objectives associated with the distribution of data elements, according to techniques presented herein. User interface 1180 is an example of what may be displayed when optimization 1105 and automatic allocation across data elements 620 are turned on. The user interface 1180 shows a list of available objectives 1115 with multiple KPIs per objective.

As discussed above, the objectives panel 1117 allows users of application 140 to prioritize KPIs 1156 that have been selected as objectives for marketplace inventories. KPIs 1156 may be dragged from the available objectives 1115 into the objectives panel 1117. If no objectives are selected, a predetermined default, such as price optimization, may be automatically selected.

The available objective may be organized into KPI groups under a single objective category. For example, the Brand Lift KPI 1143 and Completion Rate KPI 1140 may fall under the Brand Awareness objective 1136. Similarly, the Purchase Intent Lift KPI 1153 and Click-through Rate ("CTR") 1150 KPIs may fall under the consideration objective 1146. A user may be prohibited from selecting multiple KPIs from the same objective category. For example, if a user has selected Completion Rate 1140 as an objective, the user may be prohibited from also selecting Brand Lift 1143 as an objective, as a KPI from the Brand Awareness objective 1136 has already been selected.

Once a KPI has been selected as an objective, associated data may be populated in the objectives panel 1117. For example, if In Target Impressions 1133 has been selected, data may be obtained and displayed regarding the target group that the user may have previously input in a forecast measurement provider. The user may or may not be able to edit the particular constraints of the KPI, in this case age and gender data of the target group.

Certain KPIs 1156 may be compatible for mutual optimization and certain others may not, even if KPIs are classified under different objectives. When a user selects a KPI as an objective, a compatibility may be determined with other KPIs. Non-compatible KPIs may be grayed out or otherwise made unavailable for selection as a second objective. For example, In Target Impressions 1133, Completion Rate 1140, and CTR 1150 may be able to be selected as objectives and optimized simultaneously. Similarly, Brand Lift 1143 and Purchase Intent Lift 1153 may be able to be both selected as objectives and optimized simultaneously. However, if a user selects In Target Impressions 1133 as an objective, Brand Lift 1143 and Purchase Intent Lift 1153 may be determined incompatible, and grayed out or otherwise restricted. A tool tip or other communication to the user may be presented to explain the incompatibility, for example, if a user attempts to select a grayed out KPI. In this manner, a user may be able to optimize along a central theme, such as brand awareness, or purchase intent. Thus, techniques presented herein may enable theme-based optimization simultaneously with ranked objective-based optimization.

Once objectives are selected in the objectives panel 1117, a user may be able to drag the objectives to reorder them. For example, a user may be able to drag the secondary objective above the primary objective in the objectives panel 1117 in order to turn the secondary objective into the primary objective. When new objectives are selected or existing objectives are reordered, the delivery and audience forecast panel 825 may be updated.

The number of objectives that may be selected for simultaneous optimization may be limited in the objectives panel 1117. For example, a maximum of three objectives might be selectable in the objectives panel 1117. In other embodiments, more than three objectives may be designated by a user.

The application 140 may also utilize product flags which allow the enabling of various bundles of software features. For example, if the features associated with the objective-centric workflow have been enabled, the user may see the objectives panel 1117, but may be restricted from being able to optimize for Brand Lift 1143 or Purchase Intent Lift 1153. If the additional features associated with brand lift optimization are enabled, the user may be able to optimize for Brand Lift 1143 and Purchase Intent Lift 1153, but these features may otherwise be restricted. Some features or sets of features may rely on other sets of features to be enabled in order for themselves to be accessible. If the features associated with the objective-centric workflow have not been enabled, enabling brand lift optimization may have no effect, as the objectives panel 1117 would not be visible to enact brand lift optimization features.

Continuous optimizations may be performed throughout the campaign. This continuous optimization may be focused on serving an audience with certain user behavior. For example, if the in-target optimization for a data element is with females aged 18-49, the system may focus on serving to an audience with viewers having behavior similar to or related to the females aged 18-49 age/gender group.

The top optimization schemes may be tested and identified including frequency, sites, segments, etc. The top optimization schemes may be reused utilizing the optimum frequency of data element distribution, optimum sites for data element distribution, and/or optimum consumer segments, for example. The system may be able to improve performance by increasing resources for a delivered high-performance inventory, and reducing resources to a delivered low-performance inventory. The system may first calculate a realistic or average KPI for each optimization objective based on the forecasting. The system may then calculate a target KPI for each optimization based on both the realistic KPI and the KPI value set by the user. The system may then reward any inventory with a KPI better than the target KPI, and may penalize any inventory with a KPI worse than the target.

The system may also be able to constrain delivery within certain sites and within certain segments. This may be aided with user input.

With these techniques and others presented herein, at least some embodiments presented herein allow having multiple objectives in a manner which is both stable and scalable. Scalability may be a barrier to optimization, since a user may need to manually generate the site/segment list for each data element. Further, some of the selected objectives may conflict. In the real world, for example, high completion rate data element inventories often have low click rates, since a click usually redirects the user to an external website before the video is completed. If the advertiser wishes to optimize for both CTR and CR simultaneously, the objectives may conflict. Another challenge is adapting to recent changes. During the flight of a data element campaign, the performance of a strategy may deteriorate as it ages.

In examples used above, KPIs may also be used that provide brand lift. Brand lift data may be generated internally to application 140, or imported from a third party data service. Typical equations to generate brand lift metrics may include: Incremental Brand Impact ("IBI")=Brand Awareness Lift*Reach; Brand Cost Per Action ("Brand CPA")=Spend/IBI; Brand Impact per Thousand Impressions (BPM)=IBI/Impressions/1000; Brand ROI ("BROI")=IBI/Spend. The brand ROI may be similar to the ROI determination, except that IBI is in the numerator. IBI may quantify the viewer perception impact, which may be derived via surveys, coupled with the scale of the impact. For example, survey providers may measure the rise, or lift, in consideration of purchasing a product by conducting a survey. This lift may be captured as a percentage. Once the average lift is determined, the average lift may be multiplied by the estimated number of impacted viewers to obtain the IBI.

Certain KPIs 1156 may engage different external sources of data. For example, brand lift optimization features such as Brand Lift 1143 and Purchase Intent Lift 1153 may be enabled by receiving data via a third party data provider, such as via an application program interface ("API").

The application 140, based on the rankings of objectives in the objectives panel 1117, may accord a greater priority to meeting the primary objective over the secondary objective, and so on. The higher priority objective may mean that the optimization algorithm will attempt to achieve the goal with more resources, such as financial resources. However, the lower priority objectives may still receive resources. As an example model, a data element bid price for impressions may be expressed as follows:

$$Price=Base+ctr\_value(eCTR-ctr\_target)+cr\_value(eCR-cr\_target)$$

where example objectives used are CTR and Completion Rate.

The optimization system may generate a value of Base, ctr_value, ctr_target, cr_value, cr_target, and perhaps others, if optimization is enabled with one or more objectives. The Base, ctr_value, and cr_value may reflect resources allocated to each objective. The Base variable may be used to achieve a delivery goal objective. The ecpm may represent the sum of all resources allocated, and may be set by the user. Objectives with a higher priority may be allocated more resources, or a larger portion of existing resources, if the goals are not met.

For each opportunity in the market, an eCTR and eCR may be determined. These variables may be based on the information received about the advertising opportunity, and may further be used with a machine learning model.

As an example, values of these variables may be Base=1, ctr_value=1000, cr_value=5, ctr_target=0.005, cr_target=0.6. For a first opportunity with eCTR=0.1 and eCR=0.8, the system may be willing to bid 1+5+1=$6 cpm for it. For a second opportunity with eCTR=0.2 and eCR=0.9, the system may be willing to bid 1+15+1.5=$17.50 cpm for it. Thus, the formula may reward the high performance inventory with a higher bid price. The assumption here is that the higher the bid price the higher the win rate in ad space auctions.

The ctr_value and cr_value variables may correspond to factors that capture the relative priorities of each objective, and may act as a "priority multiplier." For example, if the CTR is the primary objective, the ctr_value variable would be higher than the cr_value variable. The ctr_target may be based on the CTR goal set by the user, and based on the available inventory. The ctr_target and cr_target variables correspond to the optimization algorithm and/or the user's demand for the resource. Variables ctr_target and cr_target may be based on several factors, including available supply, average performance, and the goal input by the user in panel 1117. The ctr_target/cr_target calculation represents a more realistic explanation of the given objectives. Variables eCTR and eCR may be calculated online for each incoming bid opportunity.

A value corresponding to the goal Click Through Rate may be subtracted from the forecasted or expected Click Through Rate. The resulting value may be multiplied by a priority multiplier to calculate a Click Through Rate result. Similarly, a value corresponding to the goal Completion Rate may be subtracted from the forecasted or expected Completion Rate. The resulting value may be multiplied by some other priority multiplier to calculate a Completion Rate result. The Click Through Rate result and Completion Rate result may be added together along with potentially a base value to determine a price per impression.

As a result of these techniques, the optimization algorithm may be configured to tolerate paying a higher price for higher expected Click Through Rate, and a higher price for a higher expected Completion Rate. The optimization algorithm may be considered not binary in two senses. The higher priority objectives do not necessarily cut off resources entirely from lower priority goals. The priority multipliers for each objective are not necessarily zero. The optimization algorithm may also be configured to tolerate bidding on spots for data elements with lower performance, but the price will be low.

Although Click Through Rate and Completion Rate are discussed above as examples of primary and secondary objectives, any KPI could be optimized with the above techniques, and more than two objectives could be used.

The optimization techniques discussed herein allow for forecasting supply in order to maximally achieve the stated objectives. Determining the price to be paid for promotion opportunities may be performed more carefully than prior techniques, and may take all objectives into consideration. Embodiments presented herein do not necessarily involve executing an optimizer state switch (for example, by switching the primary and secondary objective). As a result, transitions are smoother which enhances optimizer stability over prior algorithms.

Figure 12:
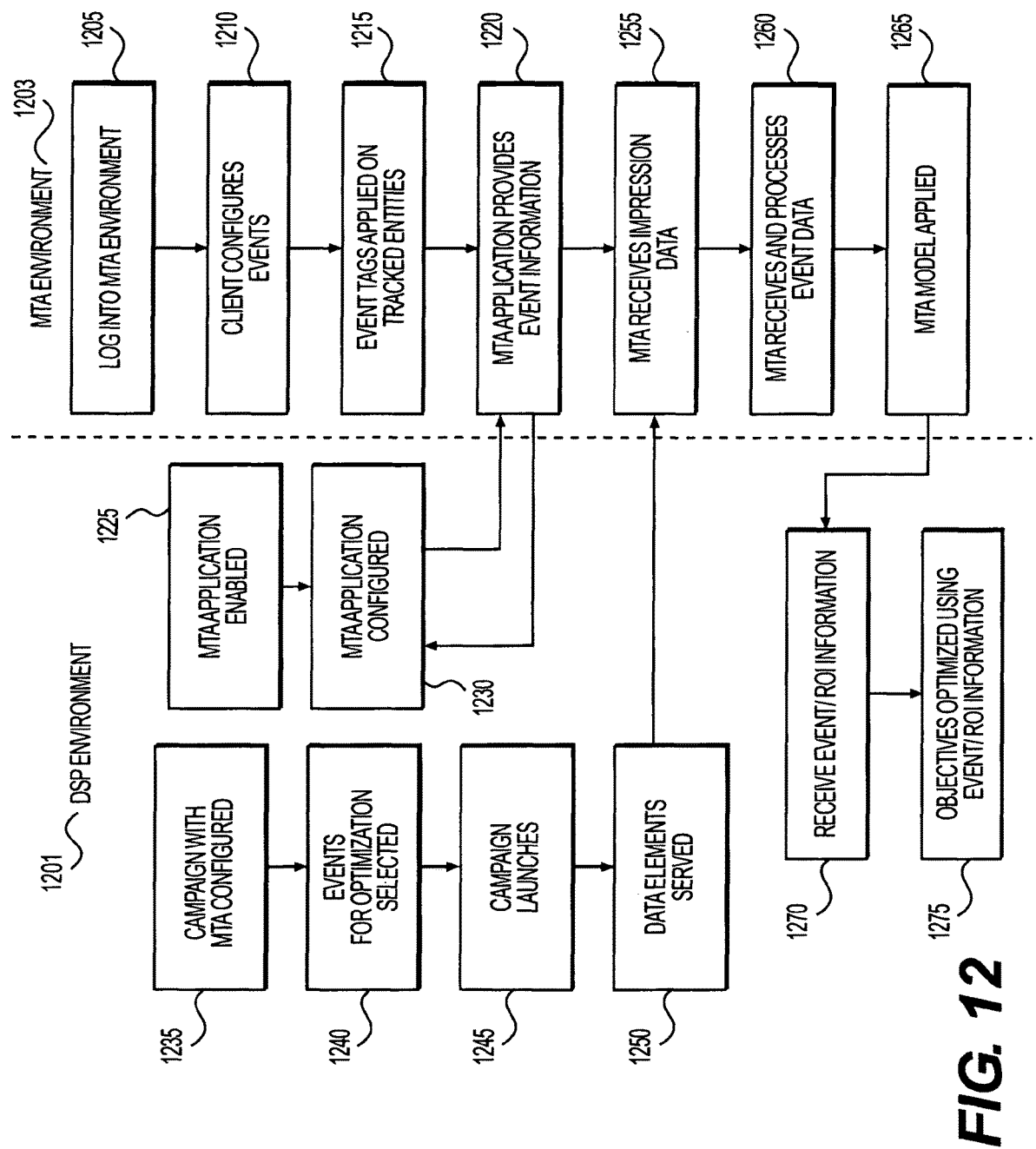
FIG. 12 is a flow diagram illustrating an example method for optimizing data element usage based on multi-touch attribution data according to techniques presented herein.

FIG. 12 is a flow diagram illustrating an example method for optimizing data element usage based on multi-touch attribution data according to techniques presented herein. The method may utilize a demand-side platform ("DSP") environment 1201 and a multi-touch attribution ("MTA") environment 1203, which may operate on a plurality of servers, for example, a publisher server 110 and an MTA server 125, respectively. Alternatively, the DSP and MTA environments may be integrated and/or run on the same server or device, such as on the publisher server 110 or the client 130. A user, who may be a privileged user and/or advertiser, may log into the MTA environment at step 1205. The one or more MTA environments 1203 may be administered by a third party. The one or more MTA environments 1203 may also provide event and/or conversion data to the DSP environment 1201 and/or client 130. For example, the one or more MTA environments 1203 may provide multi-touch attribution data to the one or more DSP environments 1201.

As stated above, the MTA environment 1203 may provide event data such as conversion data to the MTA environment 1201. As step 1210, a user may configure these events in the MTA environment. Tracking of conversion or other events may be configured using application 140, which may, for example, execute in or access the DSP environment 1201. A user may enter a tracking URL for each data element or creative, which may result in a tracking pixel or other tracking code being implemented at the data element and/or creative level. After configuration, at step 1215, event tags may be applied to tracked pages, such as data elements embedded in web pages, or other tracked entities. The event tags may comprise computer code which provide the ability to raise and log events, such as conversion events, associated with user behavior when interacting with data elements or other tracked entities. Once one or more event tags, or some other data tracking functionality, are applied, at step 1220 the MTA application, which may be a portion of application 140, may provide event information for storage and/or processing. This event information may relate to impressions provided to users, user selection of data elements, such as mouse clicks of an advertisement, conversion events, such as a user completing a purchase of a product, a user reviewing an article related to a product, etc.

In the DSP environment 1201, an MTA application, operating in the MTA environment, or other features capable of receiving event information may be enabled at step 1225, for example by a user such as an advertiser. The MTA application may further be configured at step 1230. For example, a user may be required to enter credentials such as email, user name, and/or password to create a data connection with the MTA environment 1203. The data connection may occur over the network 190, and may occur via an application programming interface (API), although other types of data connections may be used. Once configured, the data connection may allow event information to be provided by the MTA environment 1203 for use in the DSP environment 1201.

When a user creates a data element group and/or campaign for which event information is tracked, at step 1235 the group and/or campaign may be configured in the DSP environment 1201. Events to be tracked for data element optimization may be selected at step 1240. Types of events which may be optimized will be discussed further below, but may include, for example, a home page click event, a sign up click event, a free trial sign up event, etc. Optimization may be performed according to techniques discussed elsewhere herein. When the campaign or data element group launches, at step 1245, listings or other indicators of data elements served or made "live" may be provided to the MTA environment 1203 at step 1250.

At step 1255, the MTA application may receive impression data corresponding to tracked pages or events. The MTA application may further receive and process event data, such as numbers of completed sales of a product or service associated with one or more data elements or the campaign, and/or related to events such as a home page click event, sign up click event, free trial sign up event, etc. At step 1265, one or more models may be applied to process impression and/or event data to generate revenue information, such as return on investment ("ROI") information. The ROI information, at step 1270, may be used by the application 140 for optimizing data element usage, and may be displayed by one or more user interfaces 150. The ROI information may be transferred from the MTA environment to the DSP environment via API, including via data push. The ROI information may also be determined in the DSP environment 1201 using data obtained from the MTA environment 1203. This may include revenue information by day or other time period, revenue information by data element, data element group, website, event, or by campaign, etc. The ROI information may be determined for each data element, data element group, etc., based on the cost and revenue or profit generated post attribution. The user interfaces 150 may also use or display data related to impressions, conversions, and/or any other event data. The event data, such as ROI information, may also be used for resource optimization, at step 1275, using optimization techniques discussed elsewhere herein.

These techniques allow for optimizing to maximize conversion by utilizing MTA data, rather than optimization by data that merely comprises last view or last click events. The application 140 may wait until a statistically significant amount of event data, such as ROI data, has accumulated before proceeding with optimization based on the ROI or other event information. The MTA environment 1203 may also signal the DSP environment 1201 when a statistically significant amount of ROI information has been obtained for a given data element, data element group, and/or campaign. The application 140 may also display a notice to a user when a statistically significant amount of event data has been gathered. The optimization may be performed on the budget, based on the ROI/conversion data and/or other optimization objectives discussed herein. The application 140 may also provide a user interface 150 that would allow a user to rank objectives, including a conversion objective, for optimization, as will be discussed further below. MTA data such as ROI data may be provided by the MTA environment 1203 on a daily basis, by some other predetermined time interval, and/or on demand.

While the steps discussed in relation to method 1200 are discussed in a certain order, many of these steps may be performed out of this order, as would be clear to a person of ordinary skill. For example, the MTA application may be enabled at step 1225 prior to conversion tags being applied to tracked pages, as in step 1215. Certain users may be restricted from enabling or disabling the MTA application. For example, a user may need to be an administrator before being able the enable the MTA application. Additional conversion events may be configured at step 1210 at any point in time. Campaigns utilizing MTA may be configured at step 1235 at any point in time. Certain steps in relation to method 1200 also may be optional. For example, the method 1200 may collect impression data at step 1255, while not collecting or utilizing conversion data, as in step 1260. As another example, while a user may receive ROI information at step 1270, optimizing objectives using this information may be optional. Further, optimization of objectives may be performed using any event-related data, not just ROI data.

Figure 13:
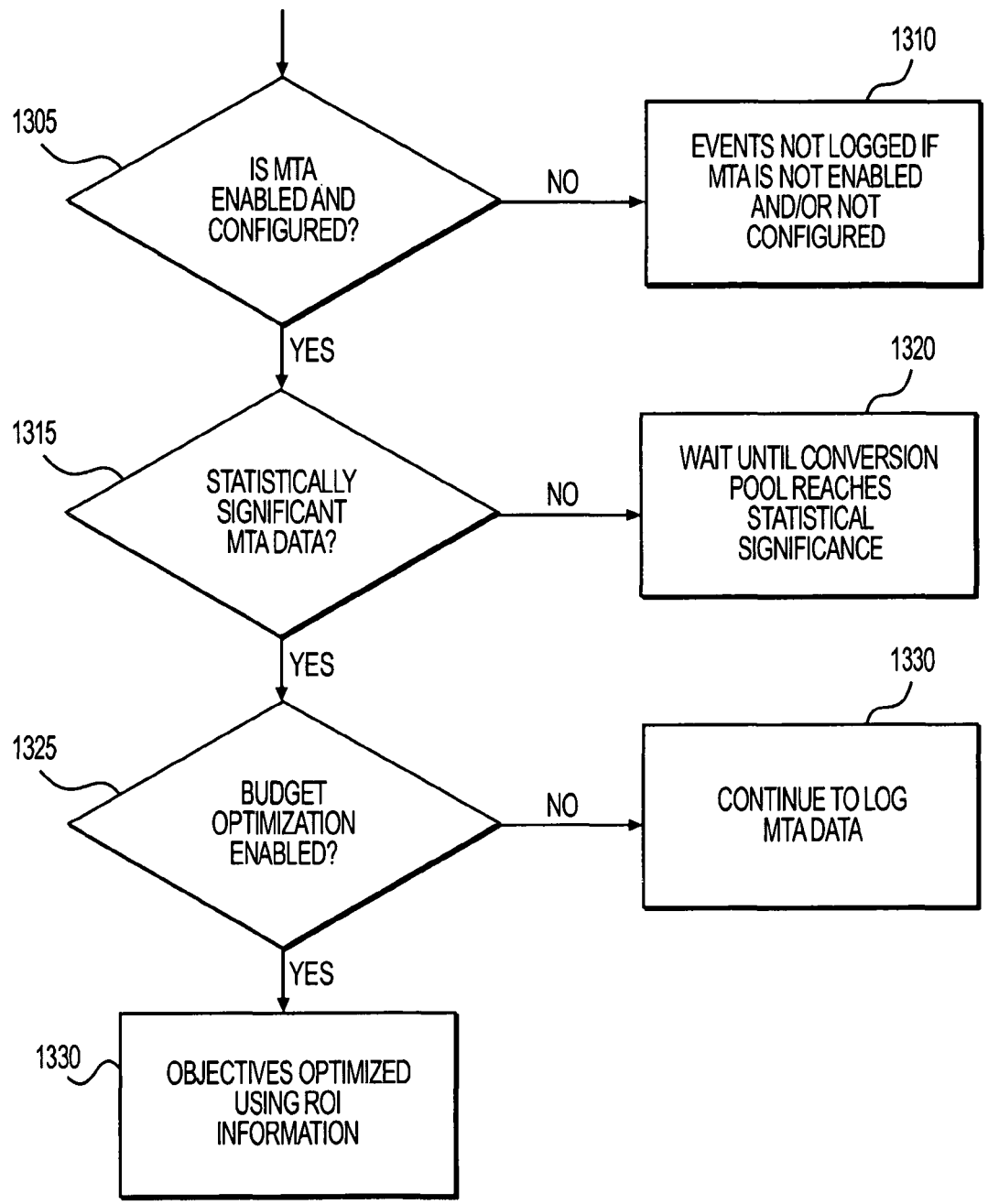
FIG. 13 is a flow diagram illustrating an example method for optimizing data element usage based on multi-touch attribution data according to techniques presented herein.

FIG. 13 is a flow diagram illustrating an example method for optimizing data element usage based on multi-touch attribution data according to techniques presented herein. Optimization using ROI data to maximize conversion, or using any other event-related data, may be unavailable unless a number of prerequisites are satisfied. At steps 1305 and 1310, if MTA is either not enabled and/or not configured, events may not be able to be stored. At steps 1315 and 1320, if the MTA data is not statistically significant, the user may be required to wait until the data pool reaches statistical significance. At steps 1325 and 1330, if optimization 805 is not enabled, the client 130, MTA server 125, publisher server 110, and/or data element server 120 may continue to log MTA data such as conversion information. At step 1330, if these requirements are met, objectives may be optimized using MTA data such as ROI information. Although the steps depicted in FIG. 13 are discussed in a certain order, the ordering may vary, and one or more steps may be optional.

FIG. 14 is an example user interface enabling the selection of objectives associated with groups of data elements according to techniques presented herein. In addition to objectives discussed elsewhere herein, a user may also be able to designate MTA-related objectives, such as a conversion maximization objective 1405. MTA-related objectives such as conversion objectives may be designated as a primary objective, secondary objective, etc. The user interface 1400 may support enabling and optimizing against MTA data, such as ROI data, for example by data element and/or data element event. One or more event types 1410 may be selected for optimization, along with a date range 1415 of these events. Once selected, the conversion objective 1405 may be displayed along with any other objectives in the objectives display at 1432. As an example, a user may wish to optimize for revenue information for the last six months, and may select a date in the date range 1415 accordingly. A default date in the date range 1415 may be to the earliest date for which a conversion event was received. The MTA-related event data may be received via pixels embedded within or around displayed data elements. Based on the received event data, performance projections may be forecast in the user interface 1400, such as in the delivery and audience forecast areas 1420. For example, actual to-date ROI 1425 and/or forecasted ROI 1430 may be displayed. The actual ROI 1425 may be calculated as (Revenue−Spent)/Spent. The forecasted ROI 1430 may be determined based on revenue, event selected, and/or data element. The forecasted ROI 1430 may further be determined based on the selected events 1432 for tracking, and optimization may occur against these selected events. When a user selects a conversion objective 1405, all other objectives may be greyed out or otherwise be made unavailable, although the user may be able to add or remove event types 1410 to the conversion objective event list 1432. To add an additional objective, an additional objective group may need to be added, such as purchase funnel objectives 1434, which may be added as a secondary objective, using the example user interface of FIG. 14.

Figure 15:
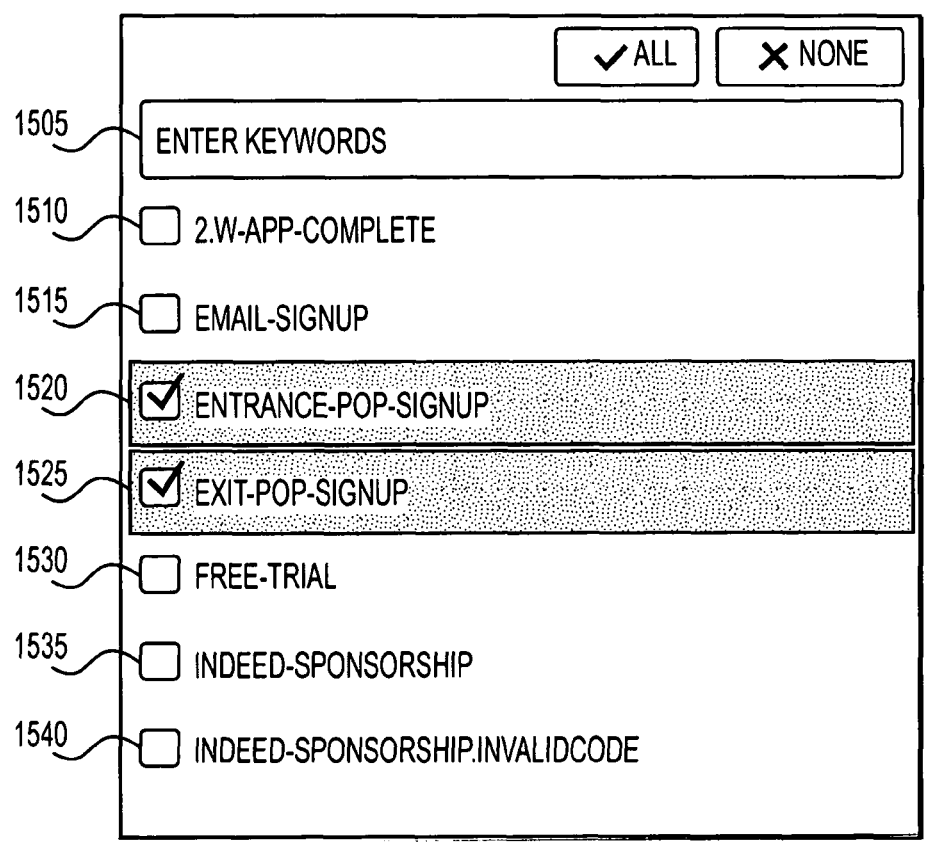
FIG. 15 is an example user interface enabling the selection of electronic events associated with groups of data elements according to techniques presented herein.

FIG. 15 is an example user interface enabling the selection of electronic events associated with groups of data elements according to techniques presented herein. When a user selects one or more event types 1410, user interface 1500 may appear and allow for the selection of events to track to meet MTA-related objectives, such as optimizing for ROI. Users may be able to search for conversion events at a search box 1505. Events which may be selectable for optimization may include 2.w app complete 1510, an email signup event 1515, a website entrance popup signup event 1520, a website exit popup signup event 1525, a selection of free trial event 1530, a selection of indeed sponsorship event 1535, and a selection of indeed sponsorship invalid code event 1540

Figure 16:
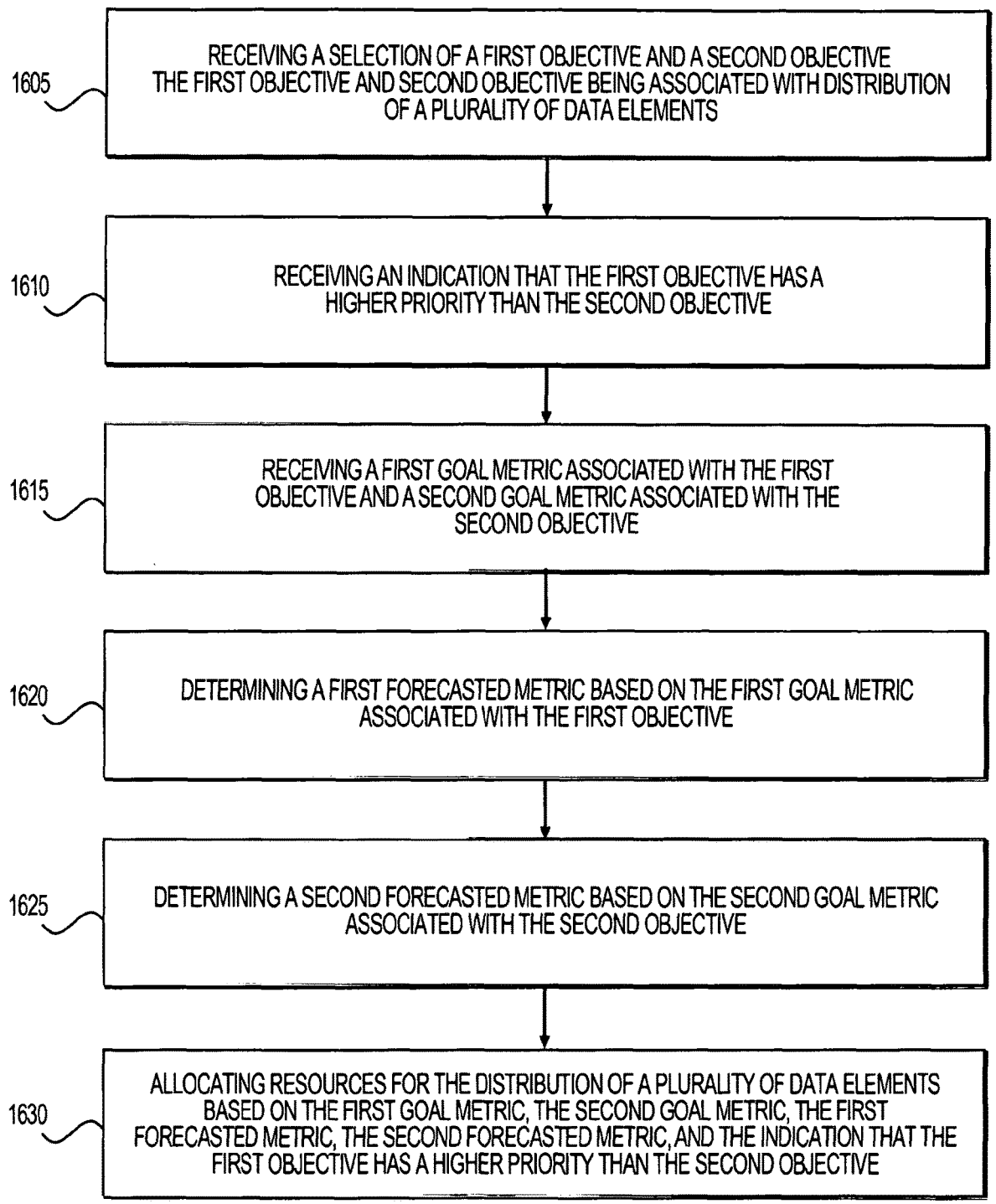
FIG. 16 is a flow diagram illustrating an example method 1600 for priority-based optimization of distribution of resources for data elements, according to techniques presented herein.

FIG. 16 is a flow diagram illustrating an example method 1600 for priority-based optimization of distribution of resources for data elements, consistent with the user interfaces described above with respect to FIGS. 11A-11C, according to techniques presented herein. At step 1605, a selection of a first objective and a second objective may be received, the first objective and second objective comprising goals being associated with distribution of a plurality of data elements. For example, in FIG. 11C, a user may designate In Target Impressions 1130 as a primary objective, and Completion Rate 1140 as a secondary objective. At step 1610, an indication that the first objective has a higher priority than the second objective may be received. For example, in FIG. 11C, in the objective panel 1160, a user may designate the In Target Impressions objective higher than the Completion Rate objective. At step 1615, a first goal metric associated with the first objective and a second goal metric associated with the second objective may be received. For example, a user may designate that the In Target Impressions be directed at females age 18-45, and the Completion Rate goal be greater than or equal to 90%. At step 1620, a first forecasted metric based on the first goal metric associated with the first objective may be determined. For example, the application 140 may forecast the ability to meet the In Target Impressions goal of the In Target Impressions objective. At step 1625, a second forecasted metric based on the second goal metric associated with the second objective may be determined. For example, the application 140 may forecast the ability to meet the Completion Rate goal for the Completion Rate objective. At step 1630, resources for the distribution of a plurality of data elements may be allocated based on the first goal metric, the second goal metric, the first forecasted metric, the second forecasted metric, and the indication that the first objective has a higher priority than the second objective. For example, the application 140 may determine a budget and/or bid price to dedicate towards the promotion of certain data elements based on the goal metrics, the forecasted metrics, and the objective panel 1117 rankings.

Techniques presented herein may provide a differentiated buying tool allowing one or more owners 305 to purchase space for promotional data elements 315 that may eliminate substantial manual work and provide real-time optimal allocation of resources to data elements. In addition, the optimization algorithm may work recursively up or down the object hierarchy, thus increasing the efficiency of optimization according to objectives and/or constraints. While many settings discussed herein may be able to be set at the data element group level, these same settings may be set at the campaign level and/or data element level, unless expressly stated otherwise herein. More generally, any setting which may be configured at any level of the object hierarchy may also be configured at any other level of the object hierarchy, unless expressly stated otherwise herein. All user interfaces shown herein, or combinations thereof, may be present in various embodiments, and may be presented to one or more users. All features discussed herein may have associated security requirements before they may be used. For example, different users of the application may have different levels of privileges, allowing them to access differing features of the application. In addition, many steps of techniques discussed herein are disclosed in a particular order. In general, steps discussed may be performed in any order, unless expressly stated otherwise.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for systems and a methods for optimizing data element usage through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for optimizing distribution of resources for data elements at an optimization server, comprising:
receiving, at the optimization server, a selection of a first objective via a user interface, the first objective comprising a goal associated with distribution of a plurality of data elements, the plurality of data elements being stored in a database;
receiving, at the optimization server, a first goal metric via the user interface, the first goal metric associated with the first objective;
determining, at the optimization server, a first forecasted metric based on the first goal metric associated with the first objective;
automatically allocating, at the optimization server, resources for the distribution of a plurality of data elements, the plurality of data elements being retrieved from the database, the allocating being based on the first goal metric and the first forecasted metric;
receiving, at the optimization server, a selection of a second objective via the user interface, the second objective comprising a goal associated with distribution of the plurality of data elements, and an indication that the second objective has a higher priority than the first objective;
disallowing, at the optimization server, selection of one or more key performance indicators as the second objective at least based on the first objective;

receiving, at the optimization server, a second goal metric via the user interface, the second goal metric associated with the second objective;

determining, at the optimization server, a second forecasted metric based on the second goal metric associated with the second objective; and automatically reallocating, at the optimization server, resources for the distribution of a plurality of data elements, the plurality of data elements being retrieved from the database, the allocating being based on the first goal metric, the second goal metric, the first forecasted metric, the second forecasted metric, and the indication that the second objective has a higher priority than the first objective.

2. The computer-implemented method of claim 1, wherein receiving a selection of a first objective further comprises receiving a selection of one of a plurality of key performance indicators.

3. The computer-implemented method of claim 1, wherein allocating resources for the distribution of the plurality of data elements comprises determining an impression price associated with publication of one or more of the plurality of data elements, wherein the determined impression price corresponds to the degree to which the first goal metric and second goal metric are to be achieved.

4. The computer-implemented method of claim 1, wherein the optimization server comprises one or more servers, and the database comprises one or more databases, and further comprising:

receiving, at the optimization server, a selection of a third objective;

receiving, at the optimization server, a third goal metric associated with the third objective;

determining, at the optimization server, a third forecasted metric based on the third goal metric; and reallocating, at the optimization server, resources for the distribution of a plurality of data elements based on the first goal metric, the second goal metric, the first forecasted metric, the second forecasted metric, the third goal metric, the third forecasted metric, and the indication that the first objective has a higher priority than the second objective.

5. The computer-implemented method of claim 1, further comprising:

determining, at the optimization server, a theme associated with the first objective; and disallowing selection of one or more key performance indicators as the second objective at least based on the first objective by disallowing, at the optimization server, selection of any key performance indicator as the second objective that is not associated with the determined theme.

6. The computer-implemented method of claim 1, wherein the first objective corresponds to an objective category associated with a plurality of key performance indicators, and further comprising:

receiving, at the optimization server, a selection of one of the plurality of key performance indicators as the first objective; and disallowing selection of one or more key performance indicators as the second objective at least based on the first objective by disallowing, at the optimization server, selection of any remaining key performance indicators associated with the objective category as the second objective.

7. The computer-implemented method of claim 1, further comprising:

determining, at the optimization server, a priority multiplier based on the indication that the second objective has a higher priority than the first objective, wherein the priority multiplier is based on the degree of higher priority that the first objective has over the second objective; and applying, at the optimization server, the priority multiplier when allocating resources for the distribution of a plurality of data elements.

8. The computer-implemented method of claim 1, further comprising:

receiving, at the optimization server, a modification in the selection of the first objective or the first goal metric; and reallocating, at the optimization server, resources for the distribution of the plurality of data elements based on the modification in the selection of the first objective or the first goal metric.

9. A system for optimizing distribution of resources for data elements, comprising:

a data storage device storing instructions for optimizing distribution of resources to data elements; and a processor configured to execute the instructions to perform a method including:

receiving a selection of a first objective via a user interface, the first objective comprising a goal associated with distribution of a plurality of data elements, the plurality of data elements being stored in a database;

receiving a first goal metric via the user interface, the first goal metric associated with the first objective;

determining a first forecasted metric based on the first goal metric associated with the first objective;

automatically allocating resources for the distribution of a plurality of data elements, the plurality of data elements being retrieved from the database, the allocating being based on the first goal metric and the first forecasted metric;

receiving a selection of a second objective via the user interface, the second objective comprising a goal associated with distribution of the plurality of data elements, and an indication that the second objective has a higher priority than the first objective;

disallowing selection of one or more key performance indicators as the second objective at least based on the first objective;

receiving a second goal metric via the user interface, the second goal metric associated with the second objective;

determining a second forecasted metric based on the second goal metric associated with the second objective; and automatically reallocating resources for the distribution of a plurality of data elements, the plurality of data elements being retrieved from the database, the allocating being based on the first goal metric, the second goal metric, the first forecasted metric, the second forecasted metric, and the indication that the second objective has a higher priority than the first objective.

10. The system of claim 9, wherein receiving a selection of a first objective further comprises receiving a selection of one of a plurality of key performance indicators.

11. The system of claim 9, wherein allocating resources for the distribution of the plurality of data elements comprises determining an impression price associated with publication of one or more of the plurality of data elements, wherein the determined impression price corresponds to the degree to which the first goal metric and second goal metric are to be achieved.

12. The system of claim 9, wherein the optimization server comprises one or more servers, and the database comprises one or more databases, and wherein the processor is further configured for:
receiving a selection of a third objective;
receiving a third goal metric associated with the third objective;
determining a third forecasted metric based on the third goal metric; and
reallocating resources for the distribution of a plurality of data elements based on the first goal metric, the second goal metric, the first forecasted metric, the second forecasted metric, the third goal metric, the third forecasted metric, and the indication that the first objective has a higher priority than the second objective.

13. The system of claim 9, wherein the processor is further configured for:
determining a theme associated with the first objective; and
disallowing selection of one or more key performance indicators as the second objective at least based on the first objective by disallowing selection of any key performance indicator as the second objective that is not associated with the determined theme.

14. The system of claim 9, wherein the first objective corresponds to an objective category associated with a plurality of key performance indicators, and the processor is further configured for:
receiving a selection of one of the plurality of key performance indicators as the first objective; and
disallowing selection of one or more key performance indicators as the second objective at least based on the first objective by disallowing selection of any remaining key performance indicators associated with the objective category as the second objective.

15. The system of claim 9, wherein the processor is further configured for:
determining a priority multiplier based on the indication that the second objective has a higher priority than the first objective, wherein the priority multiplier is based on the degree of higher priority that the first objective has over the second objective; and
applying the priority multiplier when allocating resources for the distribution of a plurality of data elements.

16. The system of claim 9, wherein the processor is further configured for:
receiving a modification in the selection of the first objective or the first goal metric; and
reallocating resources for the distribution of the plurality of data elements based on the modification in the selection of the first objective or the first goal metric.

17. A non-transitory computer-readable medium storing instructions that, when executed by a processor, cause the processor to perform a method of optimizing distribution of resources for data elements, the method including:
receiving a selection of a first objective via a user interface, the first objective comprising a goal associated with distribution of a plurality of data elements, the plurality of data elements being stored in a database;
receiving a first goal metric via the user interface, the first goal metric associated with the first objective;
determining a first forecasted metric based on the first goal metric associated with the first objective;
automatically allocating resources for the distribution of a plurality of data elements, the plurality of data elements being retrieved from the database, the allocating being based on the first goal metric and the first forecasted metric;
receiving a selection of a second objective via the user interface, the second objective comprising a goal associated with distribution of the plurality of data elements, and an indication that the second objective has a higher priority than the first objective;
disallowing selection of one or more key performance indicators as the second objective at least based on the first objective;
receiving a second goal metric via the user interface, the second goal metric associated with the second objective;
determining a second forecasted metric based on the second goal metric associated with the second objective; and
automatically reallocating resources for the distribution of a plurality of data elements, the plurality of data elements being retrieved from the database, the allocating being based on the first goal metric, the second goal metric, the first forecasted metric, the second forecasted metric, and the indication that the second objective has a higher priority than the first objective.

18. The non-transitory computer-readable medium of claim 17, wherein receiving a selection of a first objective further comprises receiving a selection of one of a plurality of key performance indicators.

19. The non-transitory computer-readable medium of claim 17, wherein allocating resources for the distribution of the plurality of data elements comprises determining an impression price associated with publication of one or more of the plurality of data elements, wherein the determined impression price corresponds to the degree to which the first goal metric and second goal metric are to be achieved.

20. The non-transitory computer-readable medium of claim 17, wherein the optimization server comprises one or more servers, and the database comprises one or more databases, the method further comprising:
receiving a selection of a third objective;
receiving a third goal metric associated with the third objective;
determining a third forecasted metric based on the third goal metric; and
reallocating resources for the distribution of a plurality of data elements based on the first goal metric, the second goal metric, the first forecasted metric, the second forecasted metric, the third goal metric, the third forecasted metric, and the indication that the first objective has a higher priority than the second objective.

* * * * *